(12) United States Patent
Powers et al.

(10) Patent No.: US 9,081,911 B2
(45) Date of Patent: Jul. 14, 2015

(54) MEDIATING COMMUNICATION OF A UNIVERSAL SERIAL BUS DEVICE

(71) Applicant: Architecture Technology Corporation, Minneapolis, MN (US)

(72) Inventors: Judson Powers, Ithaca, NY (US); Matthew P. Donovan, Trumansburg, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

(21) Appl. No.: 14/339,390

(22) Filed: Jul. 23, 2014

(65) Prior Publication Data

US 2014/0337558 A1    Nov. 13, 2014

Related U.S. Application Data

(63) Continuation-in-part of application No. 13/149,634, filed on May 31, 2011, now Pat. No. 8,862,803.

(51) Int. Cl.
| | |
|---|---|
| *G06F 21/57* | (2013.01) |
| *G06F 13/40* | (2006.01) |
| *G06F 13/42* | (2006.01) |
| *G06F 9/455* | (2006.01) |
| *G06F 21/85* | (2013.01) |

(52) U.S. Cl.
CPC ........ *G06F 13/4072* (2013.01); *G06F 9/45558* (2013.01); *G06F 13/42* (2013.01); *G06F 13/4252* (2013.01); *G06F 21/57* (2013.01); *G06F 21/85* (2013.01); *G06F 2009/45579* (2013.01)

(58) Field of Classification Search
CPC ............... G06F 21/57; G06F 21/85; G06F 2009/45587; G06F 9/45533
USPC ........... 710/306, 313, 314; 726/11, 13, 22–25
See application file for complete search history.

(56) References Cited

U.S. PATENT DOCUMENTS

| | | | |
|---|---|---|---|
| 7,024,548 | B1 | 4/2006 | O'Toole, Jr. |
| 7,748,040 | B2 | 6/2010 | Adelstein et al. |
| 7,788,425 | B2 | 8/2010 | Ikemoto |

(Continued)

FOREIGN PATENT DOCUMENTS

WO    2011004020 A2    1/2011

OTHER PUBLICATIONS

"Universal Serial Bus 3.0 Specification: Including Errata and ECN's Through May 1, 2011," Hewlett-Packard Co. et al., revision 1.0, retrieved from Internet at www.usb.org, Jun. 6, 2011, 531 pp.

(Continued)

*Primary Examiner* — Brian Misiura
(74) *Attorney, Agent, or Firm* — Shumaker & Sieffert, P.A.

(57) ABSTRACT

In an example, an apparatus includes a memory storing a hypervisor, where the hypervisor is configured to determine whether one or more universal serial bus (USB) devices in communication with the hypervisor are authorized to communicate with a guest operating system of the hypervisor and, after determining that the one or more USB devices are authorized to communicate with the guest, virtualize the one or more USB devices at the guest operating system and transfer messages between the one or more USB devices and the virtualized USB device.

33 Claims, 20 Drawing Sheets

(56) References Cited

U.S. PATENT DOCUMENTS

| | | | |
|---|---|---|---|
| 7,865,893 B1* | 1/2011 | Omelyanchuk et al. | 718/1 |
| 8,011,013 B2 | 8/2011 | Bacastow | |
| 8,209,739 B2 | 6/2012 | Terpening et al. | |
| 8,230,149 B1 | 7/2012 | Long et al. | |
| 8,363,669 B2* | 1/2013 | Mejdrich et al. | 370/412 |
| 8,402,528 B1 | 3/2013 | McCorkendale et al. | |
| 8,615,656 B2* | 12/2013 | Weinstein et al. | 713/168 |
| 8,646,082 B2 | 2/2014 | Lomont et al. | |
| 8,689,213 B2* | 4/2014 | Philipson et al. | 718/1 |
| 8,706,942 B2* | 4/2014 | Madukkarumukumana et al. | 710/306 |
| 8,850,090 B2* | 9/2014 | de Goede | 710/53 |
| 2006/0191004 A1 | 8/2006 | Alcouffe | |
| 2008/0005415 A1 | 1/2008 | Lopez et al. | |
| 2009/0249464 A1 | 10/2009 | Chang et al. | |
| 2010/0146307 A1 | 6/2010 | Griffin, Jr. et al. | |
| 2011/0088093 A1 | 4/2011 | Kang et al. | |
| 2012/0042099 A1 | 2/2012 | Wong et al. | |
| 2012/0117280 A1 | 5/2012 | Ballot et al. | |
| 2012/0240234 A1 | 9/2012 | Lomont et al. | |
| 2012/0311207 A1 | 12/2012 | Powers et al. | |

OTHER PUBLICATIONS

"Universal Serial Bus Specification," Compaq et al., revision 2.0, retrieved from internet at www.usb.org, Apr. 27, 2000, 650 pp.

* cited by examiner

MEDIATING COMMUNICATION OF A UNIVERSAL SERIAL BUS DEVICE

This application is a continuation-in-part of U.S. application Ser. No. 13/149,634, filed May 31, 2011, the entire contents of which are incorporated by reference herein.

TECHNICAL FIELD

This disclosure relates to universal serial bus devices.

BACKGROUND

Computing devices (e.g., personal computers, mobile telephones, electronic handheld devices, gaming consoles, or other similar devices) may communicate with a variety of peripheral devices using a Universal Serial Bus (USB) connection. The USB connection may also provide power to the peripheral devices. Some examples of peripheral devices that may use a USB connection include mice, keyboards, digital cameras, printers, personal media players, mass storage devices such as Flash drives, network adapters, and external hard drives. For many of those devices, USB has become the standard connection method.

SUMMARY

In general, this disclosure is directed to mediating communication between a host computing device and a universal serial bus (USB) device. In particular, the techniques of this disclosure generally include determining whether a USB device is authorized to communicate with a host computing device. For example, aspects of this disclosure include identifying a USB device using an identifying characteristic and determining whether the identified USB device is authorized to communicate with a particular host computing device. The determination may be made, for example, by comparing the identified USB device to a stored set of authorized USB devices. If the identified USB device is not authorized to communicate with the host computing device, aspects of this disclosure include inhibiting the identified USB device from communicating with the host computing device.

The techniques of this disclosure also generally include determining whether a USB device is properly communicating with a host computing device. In particular, the techniques of this disclosure generally include determining whether a USB device is authorized to execute certain commands with respect to the host computing device, whether the USB device has the appropriate USB descriptors, and the like. Aspects of this disclosure include inhibiting the USB device from communicating with the host computing device if the USB device is not communicating properly with the host computing device.

Techniques of this disclosure also include mediating communication between a host computing device and a universal serial bus (USB) device. For example, the techniques of this disclosure include determining whether a USB device is authorized to communicate with a host computing device, as well as whether the USB device is communicating appropriately with the host computing device. If the identified USB device is not authorized to communicate with the host computing device or not communicating properly with the host computing device, the techniques may further include inhibiting the identified USB device from communicating with the host computing device. According to aspects of this disclosure, the mediation techniques may be performed by a hypervisor that virtualizes the USB device for a guest operating system managed by the hypervisor and hosted by the host computing device that executes the hypervisor. In some aspect of this disclosure, the mediation techniques may be performed by a hypervisor that virtualizes the USB device for an operating system that is executed directly by the host computing device (i.e. is not virtualized).

In an example, a computing device includes at least one processor and a hypervisor operable by the at least one processor and configured to determine whether a universal serial bus (USB) device is authorized to communicate with an operating system managed by the hypervisor, and only after determining that the USB device is authorized to communicate with the operating system, transmit messages between the USB device and the operating system.

In another example, a method includes determining whether a universal serial bus (USB) device is authorized to communicate with an operating system managed by a hypervisor, and only after determining that the USB device is authorized to communicate with the operating system, transmitting messages between the USB device and the operating system.

In another example, a system includes one or more universal serial bus (USB) devices, and a USB host device having at least one processor and a hypervisor, wherein the hypervisor is operable by the at least one processor and configured to determine whether a universal serial bus (USB) device is authorized to communicate with an operating system managed by the hypervisor, and only after determining that the USB device is authorized to communicate with the operating system, transmit messages between the USB device and the operating system.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

Like reference characters denote like elements throughout the figures and text.

DETAILED DESCRIPTION

In general, this disclosure is directed to mediating communication between a host computing device and a universal serial bus (USB) device. As described herein, "mediating" refers generally to acting as an intermediary between a host computing device and a USB device. Thus, the term "mediating" is not intended to be limiting, and may comprise a variety of data generation, transmission, translation, verification, relay, and/or other functions to facilitate communication between the host computing device and the USB device.

Figure 1A:
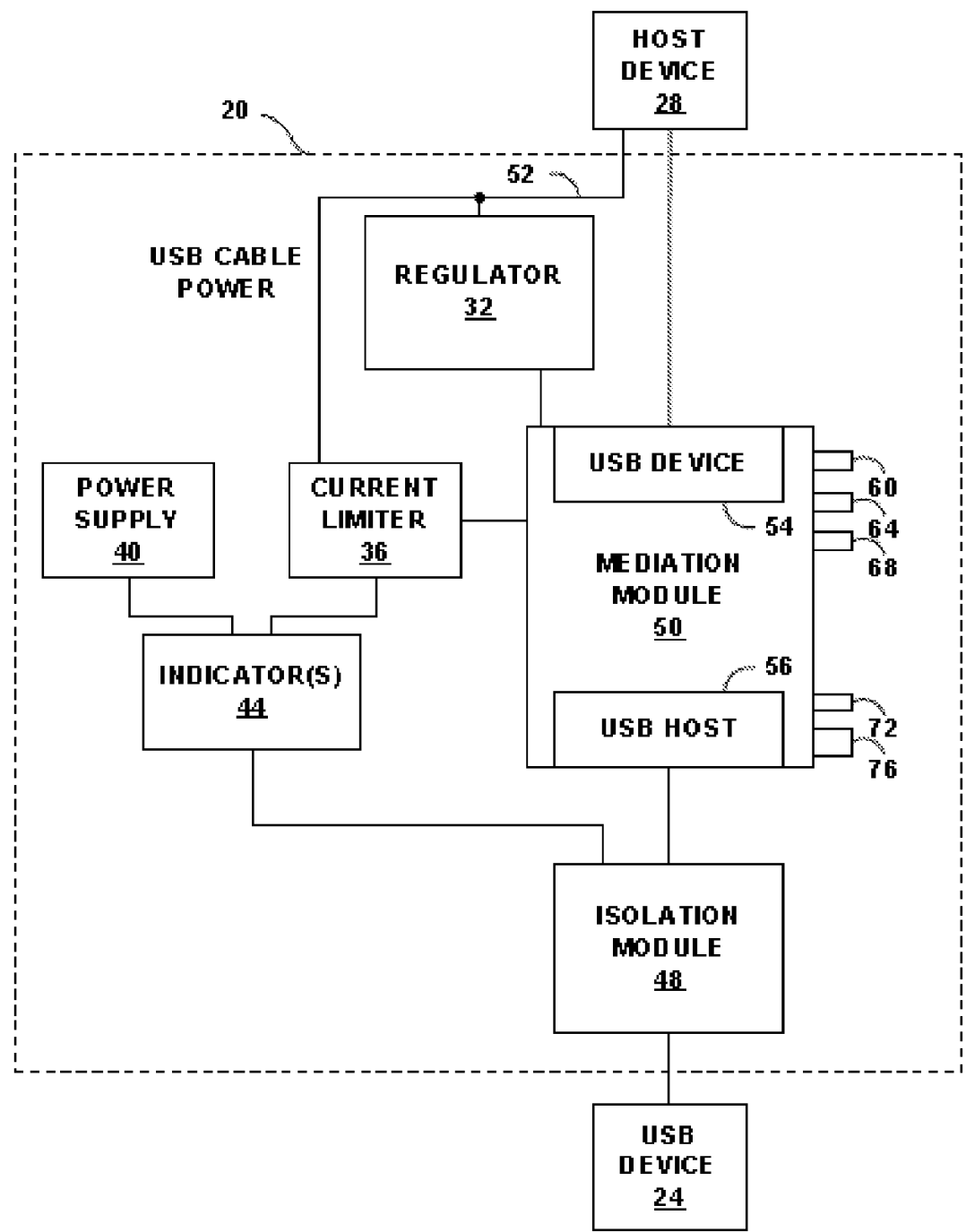
FIG. 1A is a block diagram illustrating an example system for mediating communication between a universal serial bus (USB) device and a host computing device, in accordance with one example of this disclosure.

FIG. 1A is a block diagram illustrating an example apparatus 20 for mediating communication between a universal serial bus (USB) device 24 and a host computing device 28, in accordance with one example of this disclosure. In the example shown in FIG. 1A, the apparatus 20 operates as a USB hardware firewall that includes a regulator 32, a current limiter 36, a power supply 40, one or more indicators 44, an isolation module 48, and a mediation module 50. The apparatus 20 is provided merely for purposes of example. That is, the techniques for mediation communication described in this disclosure may be performed by a variety of other systems, having more or fewer components than those shown in FIG. 1A.

In the example shown in FIG. 1A, apparatus 20 for mediating communication is electronically coupled between USB device 24 and host device 28. The USB device 24 and host device 28 are generally configured to communicate according to a common USB communication specification, and apparatus 20 operates as a USB firewall with respect to the communications. USB device 24 may, for example, communicate with host device 28 according to the USB 2.0 specification, as revised on Jul. 26, 2010, available publically at http://www.usb.org/developers/docs/usb_20_021411.zip, which is incorporated herein in its entirety by reference. In other examples, USB device 24 and host device 28 may be configured to communicate according to another USB specification, such as USB 3.0, released Nov. 12, 2008, available publically at http://www.usb.org/developers/docs/usb_30_ spec_020411d.zip, or other standards or proprietary communication specifications that are currently available or may emerge in the future. In addition, USB device 24 may be powered by host device 28. That is, for example, host device 28 may include a power supply that powers USB device 24 when USB device is connected to host device 28.

In general, USB device 24 may include a wide variety of peripheral electronic devices. In some examples, USB devices 24 can be organized according to various device classes. That is, USB device 24 may include a variety of display devices (e.g., a monitor), communication devices (e.g., a modem), audio devices (e.g., one or more speakers), mass storage devices (e.g., a flash drive or hard drive), or human interface devices (e.g., a mouse, keyboard, or the like). This listing of USB devices 24 is not intended to be exhaustive, and the techniques of this disclosure may be performed using a variety of other USB devices.

Host device 28 may include any device that is capable of hosting USB device 24. That is, typically, host device 28 includes a USB receptacle that is capable of receiving a USB plug associated with USB device 24, or vice versa. Examples of host device 28 include a wide variety of computing devices, including personal computing devices, mobile telephones, electronic handheld devices, gaming consoles, or other electronic devices.

In the example shown in FIG. 1A, apparatus 20 is powered from a power connector 52 associated with host device 28. The power from power connector 52 is split and provided to regulator 32 and current limiter 36. According to aspects of this disclosure, regulator 32 uses the power from power connector 52 to provide a regulated voltage to mediation module 50. In some examples, regulator 32 provides a 3.3 volt regulated voltage to mediation module 50.

As noted above, current limiter 36 is also connected to power connector 52 of host device 28. In some examples, host device 28 may include certain integrated functions which prevent USB device 24 from drawing too much current by disabling the connection with USB device 24 if such a condition is detected. According to aspects of this disclosure, current limiter 36 may replace such functionality of host device 28 so that USB device 24 does not cause host device 28 to remove power from apparatus 20. That is, for example, current limiter 36 may prevent an attached device, such as USB device 24, from drawing so much power that the attached device causes host device 28 to disable power associated with power connector 52. Instead, if USB device 24 draws an excessive amount of current, current limiter 36 may disable USB device 24 while apparatus 20 remains powered by power connector 52.

In the example shown in FIG. 1A, apparatus 20 includes power supply 40. According to some aspects of the disclosure, power supply 40 may be configured as a DC voltage source. For example, power supply 40 may provide a 5 volt power supply that supplies additional power to USB devices connected to apparatus 20, such as USB device 24. In some examples, power supply 40 is only routed to USB device 24, and is not supplied to mediation module 50, which is powered by the host device 28. Power supply 40 may provide the necessary power to support charging of USB device 24, for example, according to a charging standard defined in the USB specification.

In other examples, apparatus 20 may not include power supply 40. In such examples, USB device 24 may only receive power from host device 28 (e.g., via apparatus 20). In this example, apparatus 20 may not provide enough power to charge USB device 24. That is, for example, if power supply 40 is not available, apparatus 20 may only be capable of supplying 300-400 milliamps (mA) to USB device 24, which may not be enough to support charging.

Indicators 44 may provide status information to a user of apparatus 20. For example, according to some aspects of this disclosure, indicators may include one or more light emitting diodes (LEDs) that indicate whether USB device 24 is connected to apparatus 20 and powered and/or whether USB device 24 is functioning properly. In examples in which more than one USB device is connectable to apparatus 20 (as shown and described, for example, with respect to FIG. 1C), apparatus 20 may include more than one set of indicators 44, with indicators 44 for each port that accepts a USB device connection. Indicators 44 may also include other LED indicators, such as an LED to indicate with apparatus 20 is powered and functioning properly, and/or whether apparatus 20 requires external power (e.g., from power supply 40). Although described with respect to LEDs, it should be understood that a variety of devices may be implemented in apparatus 20 to provide a variety of indications to a user regarding the status of apparatus 20, USB device 24, and/or host device 28. For example, apparatus 20 may additionally or alternatively include any combination of lights, displays (e.g., a seven segment LED display, a liquid crystal display (LCD), or the like), buzzers, or other devices capable of indicating a status of system, USB device 24, and/or host device 28.

According to some examples, isolation module 48 and mediation module 50 may be highly integrated, but illustrated separately for conceptual purposes. Isolation module 48 may be configured to isolate apparatus 20 from USB device 24 in the event that USB device 24 is not authorized to communicate with host device 28, or in the event that USB device 24 is malfunctioning or identified as being a potential security threat. That is, isolation module 48 may be responsible for terminating power to USB device 24 in the event that USB device 24 is not authorized to communicate with host device 28, or in the event that USB device 24 is malfunctioning or identified as being a potential security threat.

Isolation module 48 may also determine whether a device, such as USB device 24 is connected to apparatus 20. For example, isolation module 48 may determine whether a device is connected to apparatus 20 by measuring capacitance. That is, isolation module 48 may determine that there is no device connected to apparatus 20 when measuring little or no capacitance, and may determine that there is a device connected to apparatus 20 when measuring more than a nominal amount of capacitance.

In the example shown in FIG. 1A, mediation module 50 includes a USB device interface 54 and a USB host interface 56. Mediation module 50 also includes a number of interfaces for peripheral connection, including a general purpose input/output ("GPIO") connection 60, I2C (or "Inter IC") connection 64, and a serial peripheral interface (SPI) connection 68. In addition, mediation module 50 includes a joint test action group ("JTAG") adaptor 72, which may be used for debugging purposes, and a pushbutton 76. In other examples, mediation module 50 may include more or fewer components that those shown in FIG. 1A. As an example, as shown and described with respect to FIG. 1B, mediation module 50 may include memory and components for configuration. In other examples, mediation module 50 may not include one or more of the interfaces for peripheral connection.

In general, mediation module 50 may be configured to enable apparatus 20 to mediate communication between USB device 24 and host device 28. In the example shown in FIG. 1A, mediation module 50 is connected to host device 28 via USB device interface 54, while mediation module 50 is also connected to USB device 24 via USB host interface 56. That is, for example, USB device interface 54 may be configured to connect to the upstream host device 28 as if mediation module 50 was USB device 24. In addition, USB host interface 56 may be configured to connected to the downstream USB device 24 as if mediation module 50 was host device 28.

By interposing mediation module 50 between host device 28 and USB device 24 in this way, mediation module 50 may translate messages between host device 28 and USB device 24 without either device being aware of the presence of mediation module 50. That is, for example, host device 28 may detect, or "see" mediation module 50 as a typical USB device, while USB device 24 may detect, or "see" mediation module 50 as a typical USB host. Thus, mediation module 50 may receive commands and messages from host device 28 via USB device interface 54 and transmit the commands and messages to USB device 24 via USB host interface 56 as if mediation module 50 was host device 28. In addition, mediation module 50 may receive commands and messages from USB device 24 and transmit the commands and messages to host device 28 as if mediation module 50 was USB device 24. In some examples, mediation module 50 may perform packet processing operations to deliver messages to USB device 24 or host device 28 as if mediation module 50 was host device 28 or USB device 24, respectively. For example, mediation module 50 may process and/or generate header data (e.g., token packets), while leaving payload data unchanged.

According to aspects of this disclosure, in operation, mediation module 50 may be responsible for determining whether USB device 24 is authorized to communicate with host device 28. Alternatively or additionally, mediation module 50 may be responsible for determining whether USB device 24 is communicating properly with host device 28. Accordingly, in general, mediation module 50 may enable apparatus 20 to operate as a type of firewall device in that permits or denies transmissions between host device 28 and USB device 24 based upon a set of rules, and may be used to protect host device 28 from unauthorized access by USB devices 24 while permitting legitimate communications to pass.

To determine whether USB device 24 is authorized to communicate with host device 28, mediation module 50 may initially examine an identifying characteristic associated with USB device 24. Mediation module 50 may then determine whether USB device 24 is authorized to communicate with host device 24, for example, by comparing the identifying characteristic associated with USB device 24 to a stored set of authorized identifying characteristics associated with authorized devices.

In some examples, mediation module 50 may determine whether USB device 24 is authorized to communicate with host device 28 using one or more descriptors associated with USB device 24. For example, a USB device 24 commonly includes and utilizes one or more descriptors, which may provide a variety of identifying characteristics of the USB device 24. In an example, a USB device descriptor may include information such as a USB revision with which USB device 24 complies, product identification data, vendor identification data, a serial number, and possible configurations of USB device 24. Other descriptors include configuration descriptors, interface descriptors, endpoint descriptors, and string descriptors.

Mediation module 50 may use any such descriptors to determine identifying characteristics associated with USB device 24 when determining whether USB device 24 is authorized to communicate with host device 28. Moreover, mediation module 50 may use any portion of data contained in the descriptors to determine identifying characteristics associated with USB device 24. In an example, a user of apparatus 20 may only desire host device 28 to communicate with USB devices 24 manufactured by one or more specific vendors. In this example, mediation module 50 may store a list of the vendors for use during an authentication process.

Figure 1B:
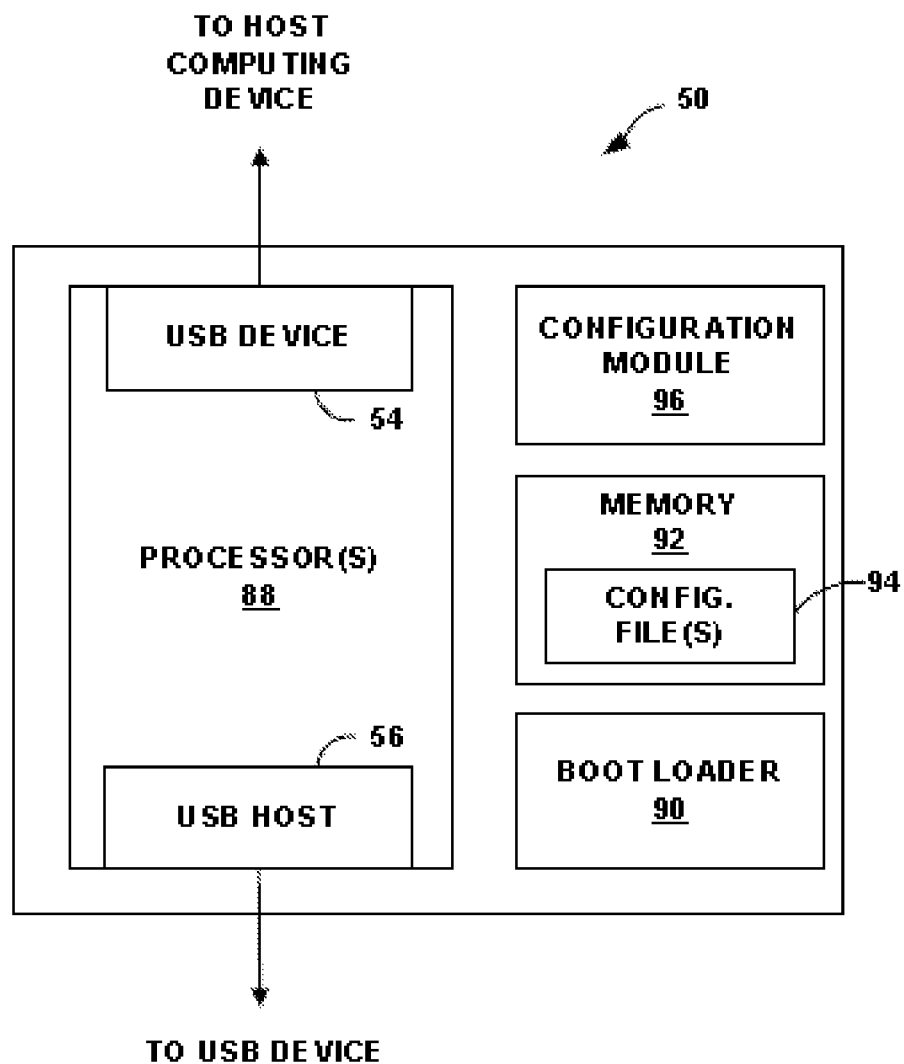
FIG. 1B is a block diagram illustrating another example system for mediating communication between a USB device and a host computing device, in accordance with one example of this disclosure.

According to some examples, as shown described in greater detail with respect to FIG. 1B, mediation module 50 may store and read the identifying characteristics of authorized devices in a memory unit (e.g., a non-volatile memory unit). In other examples, however, mediation module 50 may access identifying characteristics from another source. For example, mediation module 50 may access a database of identifying characteristics via a wired or wireless network connection (e.g., an intranet connection, and internet connect, and the like).

To authenticate USB device 24, upon connection to apparatus 20, mediation module 50 may identify USB device 24 using vendor identification data included in a device descriptor associated with USB device 24. Mediation module 50 may then compare the vendor identification information included in the descriptor with the list of authorized vendors. If the vendor of USB device 24 is not included in the authorized vendors, mediation module 50 may prevent USB device 24 from communicating with host device 28. If the vendor of USB device 24 is included in the authorized vendors, however, mediation module 50 may allow USB device 24 to communicate with host device 28.

A user or system administrator may define authentication permissions based on variety of other factors. For example, a user may determine that only a certain type of device (e.g., a display device, a communication device, an audio device, a storage device, a human interface device) is allowed to communicate with host device 28. In this example, mediation module 50 may store a list of authorize device types, and use such a list to authorize or reject USB devices when connected in the same way described above. In another example, a user may define specific USB devices 24 that are allowed to communicate with host device 28, for example, using serial numbers of USB devices. In this example, mediation module 50 may store a list of authorized serial numbers, and use such a list to authorize or reject USB devices when connected in the same way described above. Again, mediation module 50 may use any or all of the information contained in descriptors associated with USB devices 24 during the authentication process.

As noted above, if mediation module 50 determines that a connected USB device 24 is not authorized to communicate with host device 28, mediation module 50 may prevent the USB device 24 from communicating with host device 28. According to some aspects of the disclosure, for example, mediation module 50 may remove power from USB device 24 using isolation module 48. Mediation module 50 may also send a message to host device 28 indicating that authorization failed.

If mediation module 50 determines that a connected USB device 24 is authorized to communicate with host device 28, mediation module 50 may allow USB device 24 to communicate with host device 28. That is, mediation module 50 may translate messages between USB device 24 and host device 28 without altering the messages. According to some aspects of the disclosure, mediation module 50 may function similarly to a network address translation (NAT) router on an Ethernet network. For example, mediation module 50 may translate messages between USB device 24 and host device 28 without altering the contents of the packets that make up the messages. Rather, mediation module 50 may receive messages from the USB device 24 and forward the messages to host device 28. Likewise, mediation module 50 may receive messages from host device 28 and forward the messages to USB device 24. Thus, according to some aspects of the disclosure, the presence and operation of mediation module 50 is transparent to both USB device 24 and host device 28.

As noted above, mediation module 50 may also be responsible for enabling apparatus 20 to determine whether USB device 24 is communicating properly with host device 28. That is, for example, mediation module 50 may be responsible for verifying data transfers between host device 28 and USB device 24. In an example, mediation module 50 may protect host device 28 against protocol attacks from USB device 24, such as eavesdropping, by only forwarding data to a USB device 24 if the data is addressed to USB device 24 by host device 28. That is, USB device 24 is prevented from receiving or copying any data from host device 28 that is not explicitly sent to USB device 24 by host device 28.

Mediation module 50 may also protect against other protocol attacks, such as a denial of service attack. For example, typically, USB device 24 is only required to send data to host device 28 when it is requested by the host device 28. A malicious USB device, however, may send data to host device 28 when it has not been requested. In addition, a malicious USB device may improperly identify itself when sending data to host device 28. Mediation module 50 may identify packets that are sent by USB device 24 at an improper time (e.g., before the packets have been requested) and disable USB device 24. In addition, mediation module 50 may detect whether USB device 24 is identifying itself appropriately, and disable USB device 24 if USB device 24 is not identifying itself appropriately. That is, for example, mediation module 50 may determine whether USB device 24 is sending the appropriate descriptor data to host device 28, and disable USB device 24 if USB device 24 is using the appropriate descriptor data. According to some aspects of the disclosure, mediation module 50 may disable USB device 24 by removing power from USB device 24.

In addition, mediation module 50 may protect host device 28 against certain software based attacks. For example, mediation module 50 may be capable of detecting device emulation and malware propagation. That is, mediation module 50 may detect device emulation by identifying a change in the functionality of a connected USB device 24 without the USB device 24 being physically removed from apparatus 20. Mediation module 50 may also monitor and analyze the contents of the packets communicated between USB device 24 and host device 28. For example, mediation module 50 may identify malformed packets, or packets that contain known malware.

Upon detecting an attack or faulty USB device 24, mediation module 50 may prevent any unauthorized, unexpected, or malformed data (e.g., packets that do not conform to USB specification) from being transmitted to host device 28. In addition, mediation module 50 may disable USB device 24 (e.g., disable by terminating power to USB device 24). According to some examples, as shown and described with respect to FIG. 1H, certain functions described with respect to mediation module 50, such as protecting host device 28 from protocol or software based attacks, may be performed by a software module for configuring mediation module 50 that is executed by host device 28.

In addition, apparatus 20 physically separates USB device 24 and host device 28, which may help to mitigate physical and hardware based attacks. That is, by physically interposing apparatus 20 between USB device 24 and host device 28, apparatus 20 may prevent physical attacks, such as voltage overloading by a rogue USB device 24. As noted above, apparatus 20 may also be capable of protecting host device 28 from software based attacks (e.g., device emulation, malware propagation, and the like), as well as protocol based attacks.

According to some aspects of the disclosure, mediation module 50 may include a pushbutton 76, or other device (e.g., a switch, relay, a capacitive touch button, or other user input device), for configuring mediation module 50. In an example, pushbutton 76 may enable a user to configure apparatus 20 by powering up apparatus 20 with pushbutton 76 depressed. Upon powering apparatus 20 up with pushbutton 76 depressed, apparatus 20 may identify itself to host device 28. As shown and described in greater detail with respect to FIG. 1H, the user may then load one or more configuration files for use by mediation module 50 (e.g., configuration files containing authorized device information). According to some aspects of the disclosure, if pushbutton 76 is depressed at power up, but no configuration activity occurs within a specified period of time, apparatus 20 may time out and disable the ability to configure apparatus 20. When configuring apparatus 20, attached downstream devices, such as USB device 24, may not be visible to host device 28.

In this way, apparatus 20 is an example system for determining whether a USB device is authorized to communicate with a host computing device, and/or determining whether a USB device is properly communicating with a host computing device. Accordingly, in general, apparatus 20 may operate as a type of firewall device in that permits or denies transmissions between host device 28 and USB device 24 based upon a set of rules, and may be used to protect host device 28 from unauthorized access while permitting legitimate communications to pass.

In other examples, as described in greater detail below with respect to FIGS. 1C-1G, the aspects and techniques of this disclosure related to mediating communication between a USB device and a host device may be may be incorporated into a variety of other systems and form factors, having more or fewer components than those shown in FIG. 1. Moreover, it should be understood that certain components shown in the apparatus 20 of FIG. 1A may be highly integrated, but illustrated separately for conceptual purposes. That is, in other examples, certain components and/or modules shown in FIG. 1A (and elsewhere in this description) may be functionally integrated. As an example, mediation module 50 may be functionally integrated with isolation module 48.

FIG. 1B is a block diagram illustrating mediation module 50 in greater detail, in accordance with one example, of this disclosure. According to some examples, mediation module 50 may be configured similarly to mediation module 50 shown in FIG. 1A, and may be described with respect to other components shown in FIG. 1A. It should be understood, however, that mediation module 50 shown in FIG. 1B may be incorporated in a variety of other devices and systems than the apparatus 20 shown in FIG. 1A.

In the example shown in FIG. 1B, configuration module 50 includes a USB device interface 54, a USB host interface 56, and one or more processors 88. In addition, mediation module 50 includes a boot loader 90, a memory 92 having one or more configuration files 94, and a configuration module 96. In other examples, configuration module 50 may include additional components not shown in FIG. 1B for purposes of clarity. For example configuration module 50 may also include a network module for connecting to a wired or wireless network. Mediation module 50 may also include a variety of user interface devices (such as pushbutton 76 shown in FIG. 1A) that allow a user to interact with mediation module 50. Moreover, the components of mediation module 50 shown in FIG. 1B may not be necessary in every example of mediation module 50.

The one or more processors 88 (processor 88) may be configured to implement functionality and/or process instructions for execution within mediation module 50. While referred to herein as a single processing unit, it should be understood that processor 88 may include more than one processing unit. Processor 88 may be capable of processing instructions stored in memory 90 or instructions stored in another storage device. Processor 88 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to processor 88, in this disclosure, may be embodied as software, firmware, hardware or any combination thereof.

In some examples, boot loader 90 may be responsible for initializing mediation module 50 during power up. Boot loader 90 may include a unique encryption key that is placed in boot loader 90 by a manufacturer of mediation module 50. In addition, after placing boot loader 90 in mediation module 50, boot loader 90 may not be changed.

Memory 92 may include any combination of volatile or non-volatile storage. For example, memory 92 may include computer-readable storage medium that is configured to store information within mediation module 50 during operation. Accordingly, memory 92 may also be considered "non-transitory," despite storing data that can change over time. That is, for example, the term "non-transitory" may indicate that the storage medium is not embodied in a carrier wave or a propagated signal. In some examples, memory 92 is a temporary memory, meaning that a primary purpose of memory 92 is not long-term storage. Memory 92 may also, in some examples, be described as a volatile memory, meaning that memory 92 does not maintain stored contents when the computer is turned off. Examples of volatile memories include random access memories (RAM), dynamic random access memories (DRAM), static random access memories (SRAM), and other forms of volatile memories known in the art.

Memory 92 may also include one or more computer-readable storage media configured for long-term storage of information. In some examples, memory 92 may include non-volatile storage elements that may include magnetic hard discs, optical discs, floppy discs, flash memories, or forms of electrically programmable memories (EPROM) or electrically erasable and programmable (EEPROM) memories.

According to some aspects of the disclosure, memory 92 may be configured to store one or more configuration files 94. In some examples, the configuration files 94 define which USB devices (such as USB device 24 shown in FIG. 1A) are authorized to communicate with a host device to which mediation module 50 is connected. That is, for example, configuration files 94 may include one or more lists of identifying characteristics of authorized devices.

In addition, memory 92 and/or configuration files 94 may include a variety of other data. For example, memory 92 may store data that allows mediation module 50 to identify malware or other harmful code. Memory 92 may also store an event log, which identifies certain operational events, and when such events occur (e.g., using timestamps). For example, the event log may identify when USB devices are connected or disconnected from mediation module 50. The event log may also identify when unauthorized devices are connected to mediation module 50, and if any malware or other security risks are identified by mediation module 50.

Configuration module 96 may be responsible for event reporting (e.g., generating event messages to be stored in the event log). Configuration module 96 may also be responsible for accepting configuration files, firmware files, or other operational files. In some examples, configuration module 96 may include a wired or wireless network connection, thereby allowing configuration module 96 to receive files from an external source.

According to some aspects of the disclosure, configuration module 96 may be a "captive" or non-detachable USB device within mediation module 50 that provides configuration and management functionality. Accordingly, in some examples, configuration module 96 may implement a Human Interface Device ("HID") protocol to send data to, and receive data from a host device, such as host device 28 (FIG. 1A). For example, configuration module 96 may communicate with a USB host using USB HID revision 1.11, available publically at http://www.usb.org/developers/devclass_docs/HID1_11.pdf.

According to some aspects of the disclosure, mediation module 50 may include certain security features. For example, mediation module 50 may include encrypted data channels for routing data between USB device interface 54 and USB host interface 56. Moreover, mediation module 50 may include certain anti-tamper and/or anti-reverse engineering mechanisms. That is, for example, mediation module 50 may be enclosed in an anti-tamper or tamper-evident enclosure. Additionally or alternatively, mediation module 50 may be encased in an epoxy or other resin to prevent component removal or examination. Mediation module 50 may also be void of identifying marks, such as serial numbers or other common identifying marks on electronic components.

In operation, upon powering mediation module 50 on, boot loader 90 may be responsible for determining whether mediation module 50 includes a valid operating system, such as firmware that is executed by processor 88. In some examples, boot loader 90 may also take control of mediation module 50 if mediation module 50 is powered up with a user input device, such as pushbutton 76 (FIG. 1A) depressed. In this example, boot loader 90 may then allow host device 28 to configure mediation module 50. For example, boot loader 90 may allow field update tools to communicate with mediation module 50.

Boot loader 90 may also be responsible for passing control to an operating system, such as firmware, after successful boot up. For example, boot loader 90 may check for a valid operating firmware image and may pass control to a valid firmware. In some examples, if boot loader 90 does not detect a valid operating firmware image, boot loader 90 may cause mediation module 50 to connect to host device 28 and wait for a user to download a properly encrypted, valid boot loader 90 to mediation module 50.

After boot up, mediation module 50 may wait for a USB device to attach to USB host interface 56. After a USB device has been attached to USB host interface 56, mediation module 50 may enumerate the attached device, validate the attached device's descriptors, verify that the device is authorized to connect to host device 28, and begin proxy operations (e.g., data translation between USB device 24 and host device 28).

According to some aspects of the disclosure, as described with respect to FIG. 1A, mediation module 50 may validate that attached device's descriptors and verify that the device is authorized by comparing the attached device's descriptors to a set of authorized descriptors stored in memory 92. For example, mediation module 50 may use any portion of data contained in the descriptors to determine whether a particular device is authorized to communicate with the host computing device.

If the connected device is not authorized to communicate with the host computing device, mediation module 50 may turn off power to the connected device and indicate that the connected device is not authorized (e.g., using indicators 44 shown in FIG. 1A). According to some aspects of the disclosure, mediation module 50 may keep power disabled until the unauthorized attached device has been physically disconnected from mediation module 50. In some examples, mediation module 50 may identify whether a device has been physically disconnected by measuring capacitance at USB host interface 56.

In addition, if the connected device is not authorized to communicate with the host computing device, or if no USB device is connected to mediation module 50, mediation module 50 may appear to the host computing device as a "USB monitoring and security device" or other moniker. In this mode, a user (or code associated with the computing device itself) may communicate with the mediation module 50, for example, using HID class. That is, a user may be able to read and/or clear status logs, download encrypted rules files into memory 92 of mediation module 50, read descriptors of a disallowed device, send commands to attached USB devices, or the like.

If the connected device is authorized to communicate with host computing device, mediation module 50 may enumerate the connected device. For example, mediation module 50 may identify itself to the host computing device as if it were the attached USB device. After enumeration, mediation module 50 may pass all accesses from the host computing device through to the attached device so that mediation module 50 is effectively transparent to both the host computing device and the attached USB device. In this way, mediation module 50 may act as a proxy for attached USB device. For example, mediation module 50 may present an idealized version of the USB device that is attached to mediation module 50 to the host computing device. That is, if a user connects a storage device, such as a flash drive, to mediation module 50, mediation module 50 may present a storage device with the same descriptors, e.g., vendor ID, product ID, serial number, and the like, to the host computing device. When the host computing device sends a command to the attached USB device, mediation module 50 may translate, or reflect the command downstream to the attached USB device. Moreover, when the attached USB device sends a command to the host computing device, mediation module 50 may translate, or reflect the command upstream to the host computing device.

According to some aspects of the disclosure, mediation module 50 may present an authorized connected USB device to the host computing device as a composite device. That is, for example, mediation module 50 may generate and present a composite that consists of the attached USB device, as well as a mediation module 50 USB HID interface. In this example, host computing device can communicate with both mediation module 50 and the attached USB device. If the attached USB device is disconnected, mediation module 50 may also disconnect from the host computing device. Mediation module 50 may then reconnect and present itself to the host computing device, as described above.

As noted above, mediation module 50 may act as a proxy for all messages and commands sent between the host computing device and the attached USB device. For example, mediation module 50 may operate as a proxy to receive messages from a USB device as a USB host via USB host interface 56, and present the messages to a host computing device as a USB device via USB device interface 54. In addition, mediation module 50 may operate as a proxy to receive messages from a host computing device as a USB device via USB device interface 54, and present the messages to a USB device as a USB host via USB host interface 56. Accordingly, mediation module 50 may perform real-time monitoring and checking of the attached device's USB descriptors and filter potentially dangerous commands. For example, one known way for a USB device to interfere with the proper operation of a host computing device (e.g., initiate that "blue screen" of a computing device using the Windows® operating system) is for an HID USB device (e.g., a keyboard, a mouse, and the like) to return incorrectly formatted report data to the host computing device. In this example, mediation module 50 may always present an ideal HID USB device to the host computing device, while also checking and handling malformed or incorrectly processed commands.

According to aspects of this disclosure, mediation module 50 may perform the techniques and examples of this disclosure for a variety of USB devices. Some examples include mass storage class devices (e.g., including optional write-blocking features), HID class devices, printer class devices, and audio class devices (e.g., audio headsets and microphones). In addition, mediation module 50 may be compatible with other USB devices including communications device class (CDC), video devices (e.g., webcams), imaging devices (e.g., cameras or scanners), handheld devices (e.g., personal media players (PMP), gaming consoles, mobile communications devices), and other USB devices (e.g., a wireless dongle, a FLEXlm licensing dongle, and the like).

In some examples, mediation module 50 may specifically exclude some classes of devices, such as USB hubs. For example, USB hubs may interfere with the operation of mediation module 50 and may be categorically restricted, such that when a USB hub is connected to mediation module 50, mediation module 50 disables the hub and notifies a user of the computing device that an unauthorized device is attached to mediation module 50. In some examples, mediation module 50 may disable USB hubs that are integrated into other USB devices (e.g., referred to as a compound device), but enable the devices themselves. For example, mediation module 50 may support a keyboard that includes a keyboard controller behind an embedded hub, but disable any downstream USB ports associated with the hub portion.

In some examples, mediation module 50 may maintain an event log. For example, as noted above, configuration module 96 may identify events that are recorded in an event log stored on memory 92. According to some aspects of the disclosure, configuration module 96 may maintain a timer that is initialized at power up. Configuration module 96 may then log events in a circular buffer. Configuration module 96 may log a variety of operational events including, for example, rules updates, USB device attach and detach events, and error/denial of service/forced shut off events.

According to some aspects of the disclosure, the event log access and write permissions may vary depending on the client. In an example, the event log may be accessed by any client (e.g., untrusted and trusted alike). To delete or download entries from event log, however, a trusted client (e.g., a system administrator or other user that can be verified using an encrypted key) may be required. In addition, to delete or download entries from event log, modification module 50 may have to be in a configuration mode initiated at power up.

Figure 1C:
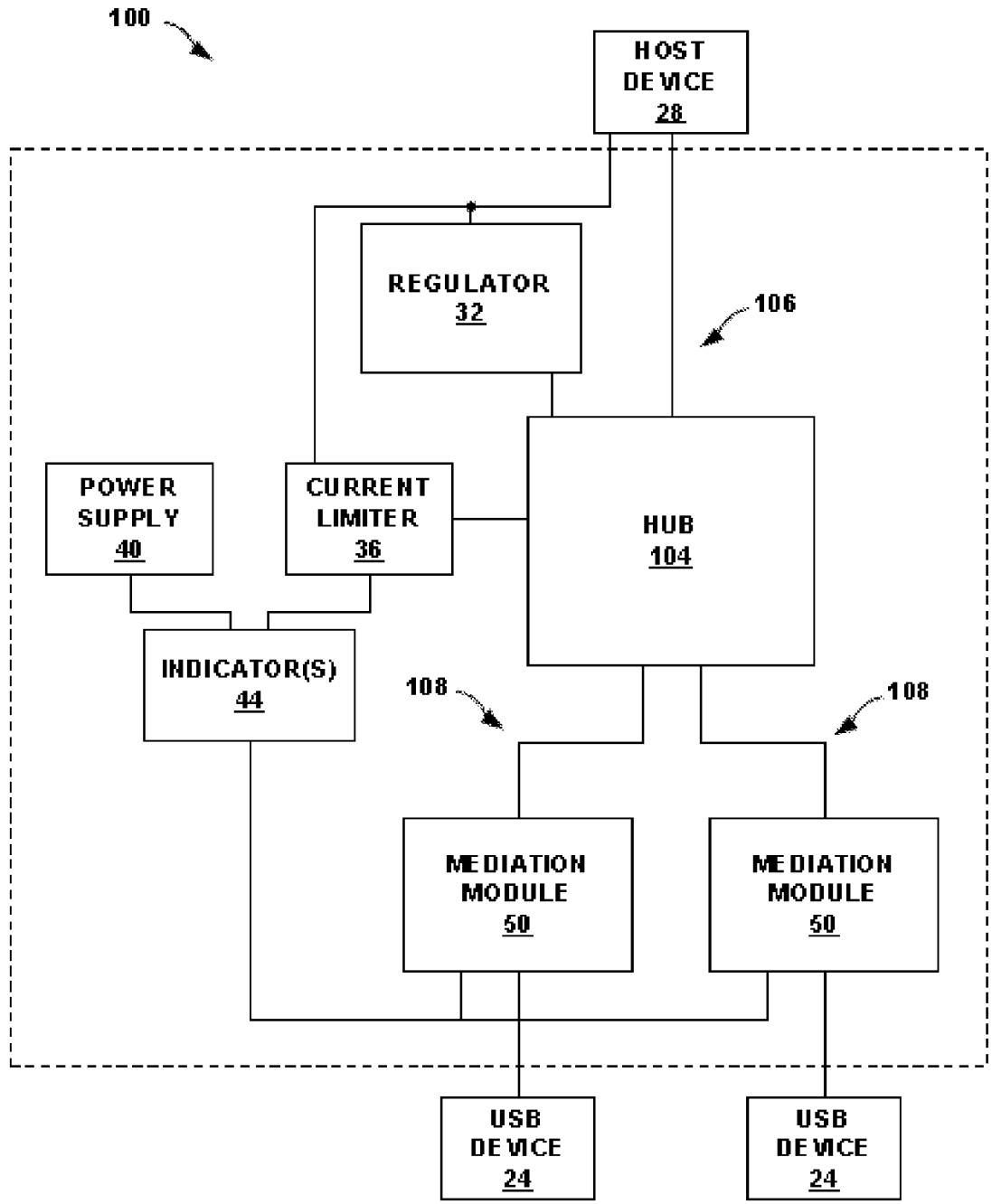
FIG. 1C is a block diagram illustrating still another example system for mediating communication between a USB device and a host computing device, in accordance with one example of this disclosure.

FIG. 1C is a block diagram illustrating another example system 100 for mediating communication between one or more USB devices 24 and a host computing device 28, in accordance with one example of this disclosure. According to some aspects of this disclosure, certain features and components of system 100 may be similar to those shown and described with respect to FIGS. 1A-1B, with like-components having the same numbers. Thus, it should be understood that the techniques for mediating communication described with respect to FIG. 1C may be performed by a variety of other systems, having more or fewer components than those shown in FIG. 1C.

In the example shown in FIG. 1C, the system 100 includes regulator 32, current limiter 36, power supply 40, and one or more indicators 44, and two mediation modules 50. In addition, system 100 includes a hub 104. In other examples, system 100 may include more or fewer components than those shown in FIG. 1C. For example, in another example, system 100 may include one or more isolation modules, such as isolation module 48 (FIG. 1A). Additionally or alternatively, system 100 may not include power supply 40. Other variations are also possible.

Hub 104 supports connection of more than one USB device 24. That is, for example, hub 104 has a single upstream connection 106 for connecting to host device 28, and multiple downstream connections 108 for connecting to multiple USB devices 24. In the example shown in FIG. 1C, each of the downstream connections 108 includes a separate mediation module 50. Thus, system 100 can separately and simultaneously mediate communication between each USB device 24 and host device 28. That is, system 100 may perform any or all of the mediating techniques shown and described with respect to FIGS. 1A and 1B for each connected USB device 24.

While FIG. 1C illustrates each connection 108 having a separate mediation module 50, according to some aspects of the disclosure, mediation modules 50 may share certain common components. For example, mediation modules 50 may share a single boot loader 90, memory 92, and/or configuration module 96.

Figure 1D:
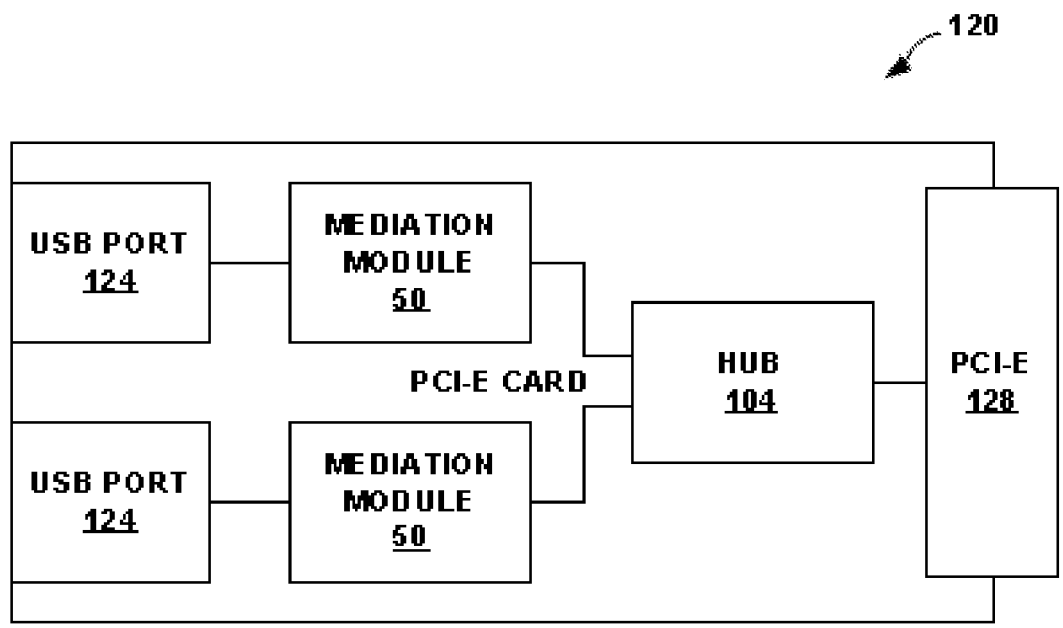
FIG. 1D is a block diagram illustrating still another example system for mediating communication between a USB device and a host computing device, in accordance with one example of this disclosure.

FIG. 1D is a block diagram illustrating another example system 120 for mediating communication between one or more USB devices and a host computing device, in accordance with one example of this disclosure. According to some aspects of this disclosure, certain features and components of system 120 may be similar to those shown and described with respect to FIGS. 1A-1C, with like-components having the same numbers. Thus, it should be understood that the techniques for mediating communication described with respect to FIG. 1D may be performed by a variety of other systems, having more or fewer components than those shown in FIG. 1D.

In the example shown in FIG. 1D, system 120 includes two mediation modules 50, a hub 104, two USB ports 124, and a Peripheral Component Interconnect Express (PCI-E) interface 128. In other examples, however, system 120 may include more or fewer components than those shown in FIG. 1D. For example, system 120 may include more than two USB ports 124 associated with hub 140. Each USB port 124 may be configured to receive a USB device, such as USB device 24 shown in FIG. 1A. That is, each USB port 124 may be configured as a USB receptacle that is configured to receive a USB plug from a USB device.

According to some aspects of the disclosure, each USB port 124 is connected to a dedicated mediation module 50, which may be configured similarly to those shown in FIGS. 1A-1C. That is, each mediation module 50 may be configured to include any or all of the components and features described with respect to FIGS. 1A-1C. According to some examples, as noted above with respect to FIG. 1C, mediation modules 50 may share certain components, such as boot loader 90, memory 92, and configuration module 96 (FIG. 1B).

In general, the example system 120 shown in FIG. 1D may be configured as a peripheral expansion card that may be connected, for example, to a mobile computing device (e.g., a laptop computer). That is, according to some aspects of the disclosure, system 120 may be incorporated into a peripheral card that conforms to the Personal Computer Memory Card International Association's (PCMCIA) ExpressCard standard, such that PCI-E interface 128 may connect to an ExpressCard slot included in a laptop computer.

In this way, system 120 physically positions mediation modules 50 between USB ports 124 and the PCI-E interface 128 that connects to a host computing device, such as host device 28 (FIG. 1A). According to some examples of the disclosure, a system administrator may physically disable native USB ports of the host computing device, thereby forcing USB devices to be connected via using system 120.

Figure 1E:
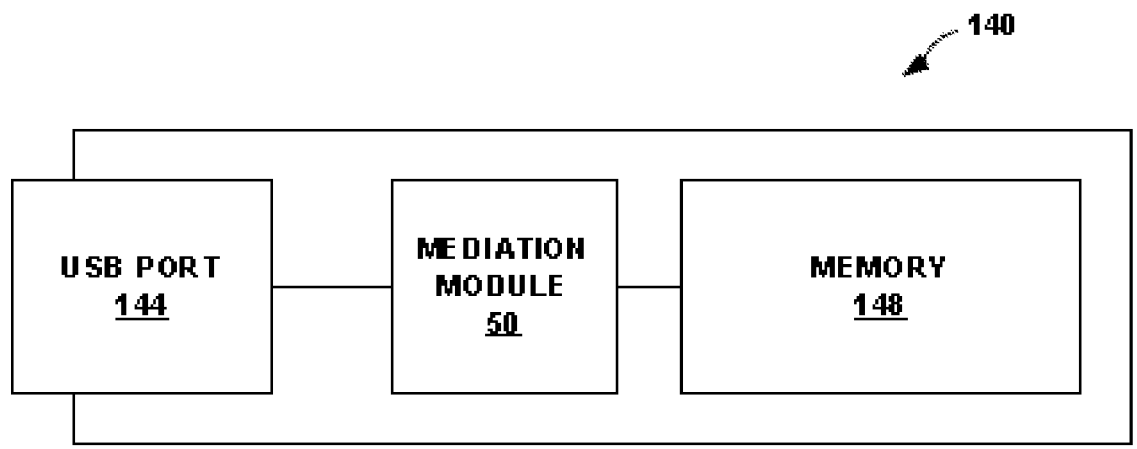
FIG. 1E is a block diagram illustrating still another example system for mediating communication between a USB device and a host computing device, in accordance with one example of this disclosure.

FIG. 1E is a block diagram illustrating another example system 140 for mediating communication between a USB device and a host computing device, in accordance with one example of this disclosure. According to some aspects of this disclosure, certain features and components of system 140 may be similar to those shown and described with respect to FIGS. 1A-1D, with like-components having the same numbers. Thus, it should be understood that the techniques for mediating communication described with respect to FIG. 1E may be performed by a variety of other systems, having more or fewer components than those shown in FIG. 1E.

In the example shown in FIG. 1E, system 140 is configured as a mass storage device that includes a mediation module 50 positioned between a USB port 144 and a memory 148. Mediation module 50 may be configured similarly to those shown in FIGS. 1A-1D. That is, mediation module 50 may be configured to include any or all of the components and features described with respect to FIGS. 1A-1D.

USB port 144 may be configured to connect to a host computing device, such as host device 28 (FIG. 1A). That is, USB port 144 may be configured as a series "A" USB connector that is configured to be connected to host computing device 28. Memory 148 may include a variety of volatile and non-volatile memories for storing data. In an example, memory 148 may be configured as Flash memory, although a variety of other types of read-only memories (ROMs) may also be used.

As noted above, in general, the example system 140 shown in FIG. 1D may be configured as a mass storage device that is connectable to a host computing device, such as host device 28, via USB port 144. According to some aspects of this disclosure, system 140 may include different functionality depending on the host computing device to which system 140 is connected. That is, for example, system 140 may be paired with a "home" host device that includes client software for configuring and/or managing mediation module 50. In this example, system 140 may have full read and write permission. That is, a user may connect system 140 to the home computing device and read files from and write files to memory 148. When system 140 is connected to a host computing device other than the home device, however, mediation module 50 may prevent files to be written to memory 148. In this way, mediation module 50 may protect memory 148 from host-based security attacks (e.g., malware trying to infect the system 140) by making memory 148 read-only.

Figure 1F:
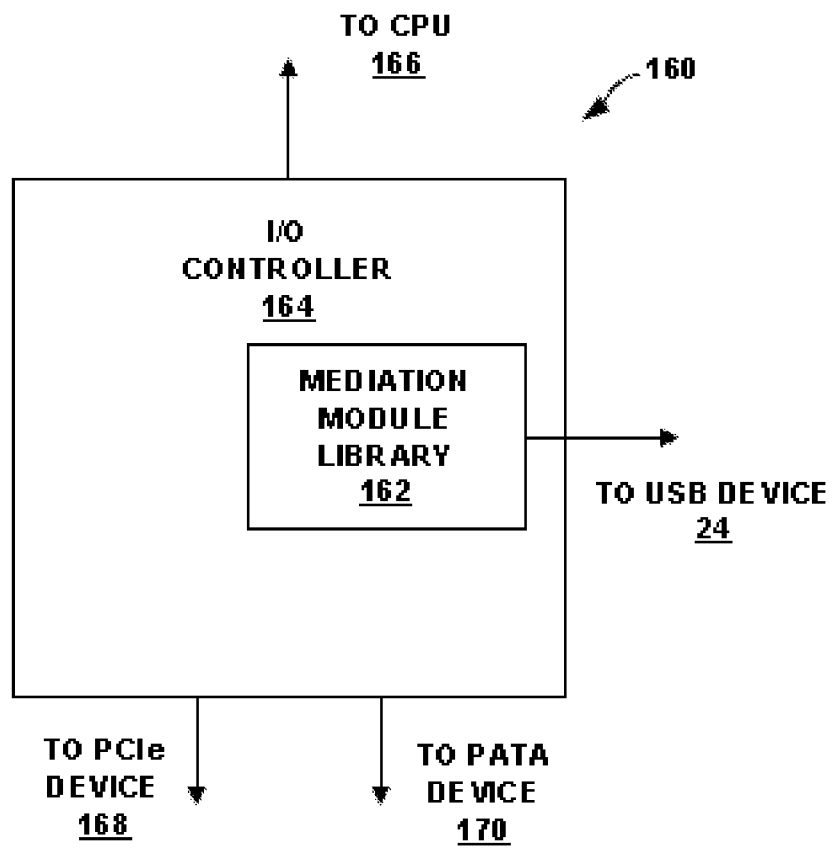
FIG. 1F is a block diagram illustrating still another example system for mediating communication between a USB device and a host computing device, in accordance with one example of this disclosure.

FIG. 1F is a block diagram illustrating another example system 160 for mediating communication between a USB device and a central processing unit (CPU) of a host computing device, in accordance with one example of this disclosure. According to some aspects of this disclosure, certain features and components of system 160 may be similar to those shown and described with respect to FIGS. 1A-1E. Thus, it should be understood that the techniques for mediating communication described with respect to FIG. 1F may be performed by a variety of other systems, having more or fewer components than those shown in FIG. 1F.

In the example shown in FIG. 1F, system 160 includes a mediation module library 162 that is integrated into an input/output ("I/O") controller 164. According to some aspects of the disclosure, mediation module library 162 may include logic that carries out the functions ascribed to mediation module 50 shown in FIGS. 1A-1E. For example, mediation module library 162 may be responsible for determining whether a USB device, such as USB device 24, is authorized to communicate with a CPU 166 of a host device, such as host device 28. Alternatively or additionally, mediation module library 162 may be responsible for determining whether USB device 24 is communicating properly with CPU 166. Other features of mediation module library 162 may also be similar to, or the same as the features described with respect to mediation module 50 shown and described with respect to FIGS. 1A-1E.

The I/O controller 164 may be used control the flow of data between CPU 166 and I/O devices including USB device 24, a PCI-E device 168, and a parallel ATA ("PATA") device 170. FIG. 1F is provided as merely an example, and I/O controller 164 may be used to control more or fewer I/O devices than those shown.

According to aspects of this disclosure, mediation module library 162 is directly integrated into I/O controller 164. That is, for example, a manufacturer of I/O controller 164 may integrate mediation module library 162 into hardware or software associated with I/O controller 164 at the time of manufacture. Thus, any computing device that I/O controller 164 may be incorporated in also receives meditation module library 162, and any USB devices 24 connected to I/O controller 164 may be mediated by mediation module library 162.

In the example shown in FIG. 1F, mediation module library 162 is incorporated into an input/output (I/O) controller 164. In other examples, however, mediation module library 162 may be incorporated into a variety of other microprocessors, digital signal processors (DSPs), application specific integrated circuits (ASICs), field programmable gate arrays (FPGAs), or any other equivalent integrated or discrete logic circuitry, as well as any combinations of such components. That is, for example, mediation module library 162 may be integrated into USB controller hardware. Thus, a manufacturer of a USB controller, which may be incorporated into a variety of computing devices, can include mediation module library 162 directly into the hardware and/or software that control USB ports.

Figure 1G:
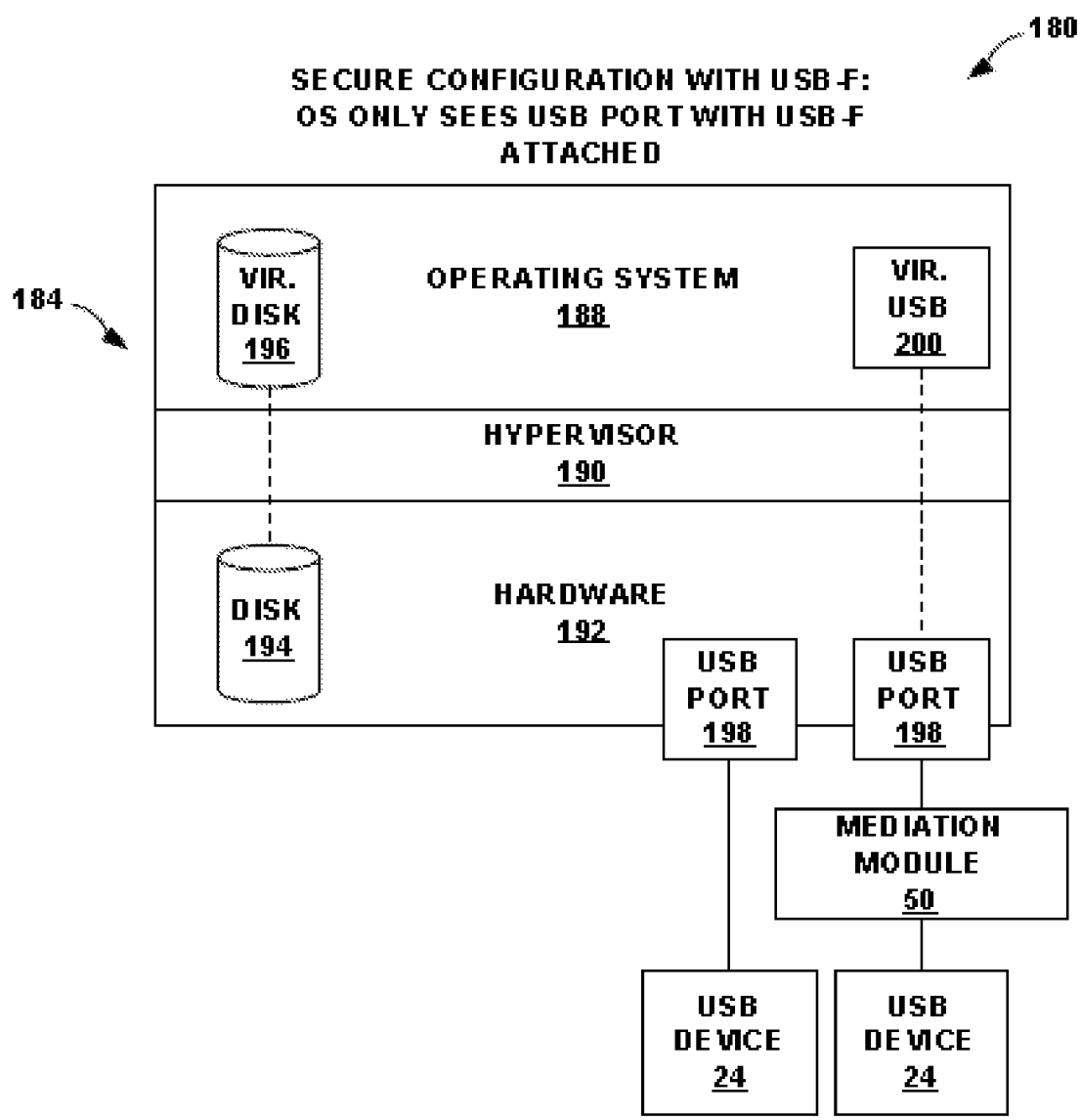
FIG. 1G is a block diagram illustrating still another example system for mediating communication between a USB device and a host computing device, in accordance with one example of this disclosure.

FIG. 1G is a block diagram illustrating another example system 180 for mediating communication between a USB device and a host computing device, in accordance with one example of this disclosure. According to some aspects of this disclosure, certain features and components of system 180 may be similar to those shown and described with respect to FIGS. 1A-1F. Thus, it should be understood that the techniques for mediating communication described with respect to FIG. 1G may be performed by a variety of other systems, having more or fewer components than those shown in FIG. 1G.

In the example shown in FIG. 1G, system 180 includes a host computing device 184 having an operating system 188, a hypervisor 190, and hardware 192. Hypervisor 190, which may also be referred to as a virtual machine manager ("VMM") may present a virtualized version of hardware 192 to operating system 188. For example, hypervisor 190 may manage a hard disk 194 (e.g., memory) of hardware 192 by presenting a virtual hard disk 196 to operating system 188. Likewise, hypervisor 190 may manage USB ports 198 of hardware 192 by presenting a virtual USB device 200 to operating system 188.

According to some aspects of the disclosure, certain functions of hypervisor 190 may depend on mediation module 50. In an example, hypervisor 190 may only present a virtual USB device 200 to operating system 188 if the USB device 24 connected to USB port 198 is connected using mediation module 50. That is, hypervisor 190 may not present a USB device 24 to operating system 188 if the USB device 24 is not connected to USB port 198 via mediation module 50. Rather, hypervisor 190 simply ignores the connected USB device 24, such that a user cannot access the USB device 24 using operating system 188.

Figure 1H:
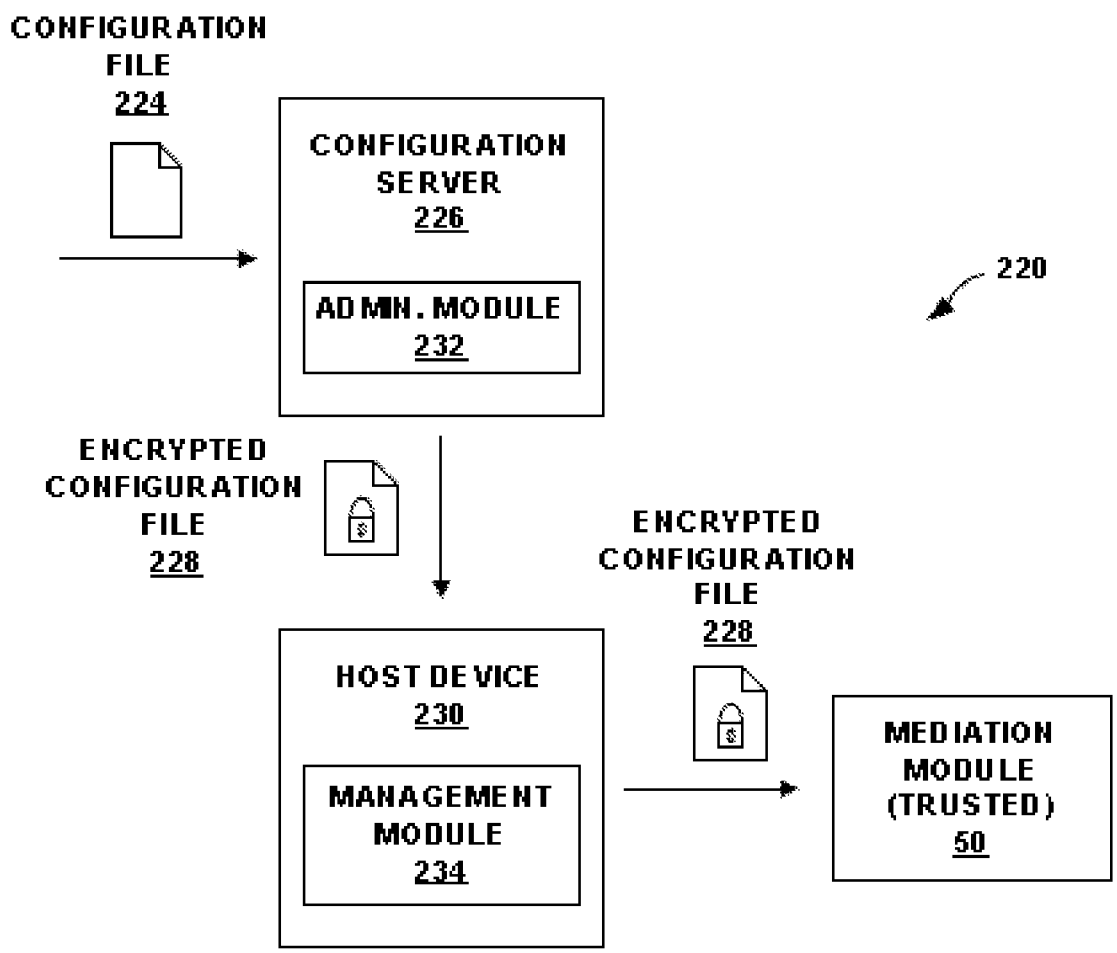
FIG. 1H is a schematic diagram illustrating an example configuration of a system for mediating communication between a USB device and a host computing device, in accordance with one example of this disclosure.

FIG. 1H is a schematic diagram illustrating an example system 220 configuring a mediation module that may mediate communication between a USB device and a host computing device, in accordance with one example of this disclosure. According to some aspects of the disclosure, the example system 220 may be implemented to configure mediation module 50 shown in FIGS. 1A-1E and 1G, or mediation module library 162 shown in FIG. 1F, although the system 220 may be used in conjunction with other mediation modules.

In the example shown in FIG. 1H, system 220 includes a configuration file 224 that is passed to a trusted configuration server 228. An encrypted version of configuration file 228 is then passed from the configuration server 226 to a host device 230. Host device 230 then passes the encrypted configuration file 228 to mediation module 50. In this way, configuration file 224 may be transmitted from a trusted source, such as a system administrator, to a mediation module 50.

According to some aspects of the disclosure, configuration file 224 may be defined by an end user or system administrator. Configuration file 224 may contain a variety of data, including for example, definitions of which USB devices are authorized to communicate with a particular host device to which mediation module 50 is connected (e.g., one or more lists of identifying characteristics of authorized devices). Configuration file 224 may also include data that allows mediation module 50 to identify malware or other harmful code.

Configuration server 226 may operate an administrative module 232 that is responsible for encrypting configuration file 224. Administrative module 232 may also be responsible for maintaining and managing the encryption keys used to encrypt configuration file 224. Administrative module 232 may be password protected, or may include other security measures to ensure that configuration file 224 and the encryption key to configuration file 224 are not tampered with. In some examples, administrative module 232 may maintain a database that stores a mapping between serial numbers of mediation modules 50 and encryption keys.

According to some aspects of the disclosure, host device 230 may include a management module 234 that includes a management software package delivering encrypted configuration file 228 to mediation module 50. Management module 234 may have a variety of configurations, depending on the end user. For example, management module 234 may be configured in a standard edition, a home edition, and an enterprise edition.

Figure 8:
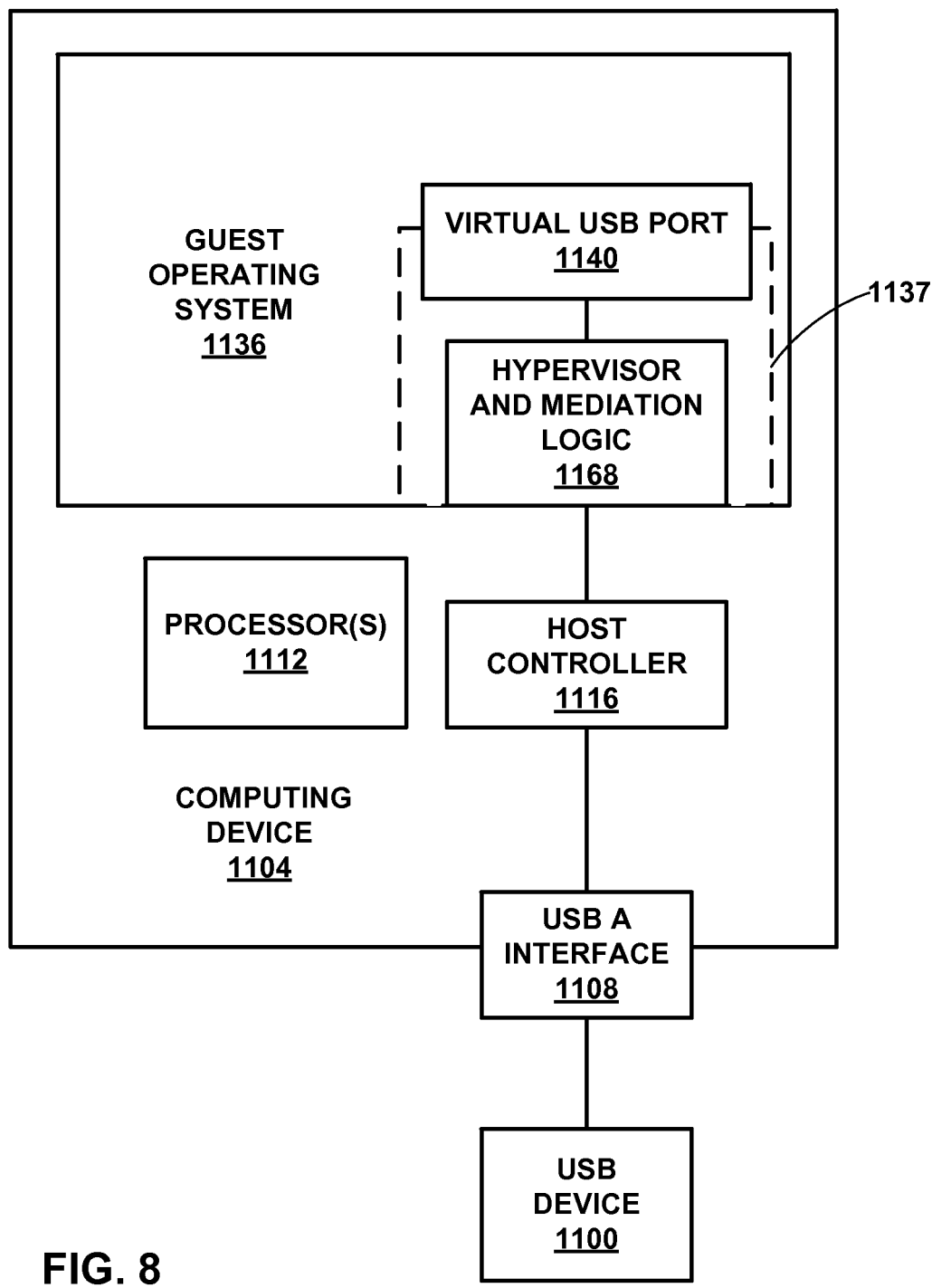
FIG. 8 is a block diagram illustrating another example system for mediating communication between a USB device and a host computing device, in accordance with techniques described in this disclosure.

A standard edition management module 234 may allow a user to configure mediation module 50 locally. That is, for example, rather than having administrative module 232 installed on a configuration server 226, as shown in FIG. 8, administrative module 232 may be installed on host device 230 with management module. In this example, management module 234 may work in tandem with a local administrative module 232 to encrypt and deliver an encrypted configuration file 228 to mediation module 50.

A home edition management module 234 may allow a user to configure mediation module 50 using an online service, provided by a trusted administrator. In this example, configuration server 226 may be maintained by a manufacturer or distributor of mediation module 50 and may be accessible via an internet connection. Accordingly, a user of host device 230 can access configuration server 226 using a web-based interface. After receiving an encrypted configuration file 228, management module 234 may provide the encrypted configuration file 228 to mediation module 50.

An enterprise edition management module 234 may support distributed configuration and management of multiple host devices 230. That is, for example, enterprise edition management module 234 may provide remote configuration of a set of host devices 230 connected to a network. In this example, when a mediation module 50 is connected to a host device 230 on the network, the host device 230 may send a message to an administrative module 232 maintained by a system administrator. The administrative module 232 then returns an encrypted configuration file 228 that is specifically tailored for the host device 230 or the user of the host device. According to some aspects of the disclosure, management module 234 may be responsible for transmitting an encrypted configuration file to mediation module 50, as well as updating the configuration file.

According to some aspects of the disclosures, management module 234 also includes device drivers that provide higher-level security features, such as malware scanning of attached USB devices, and provides event notifications to a user of host device 230, such as when a USB device 24 is attached or removed. That is, according to some examples, management module 234 may perform operations intended to protect host device 230 from software and/or protocol based attacks. According to some aspects of this disclosure, management module 234 may protect against protocol attacks (e.g., a denial of service attack), device emulation, and/or malware propagation, as described with respect to FIG. 1A. In some examples, such features are optional, and not required for operation of mediation module 50.

Figure 1I:
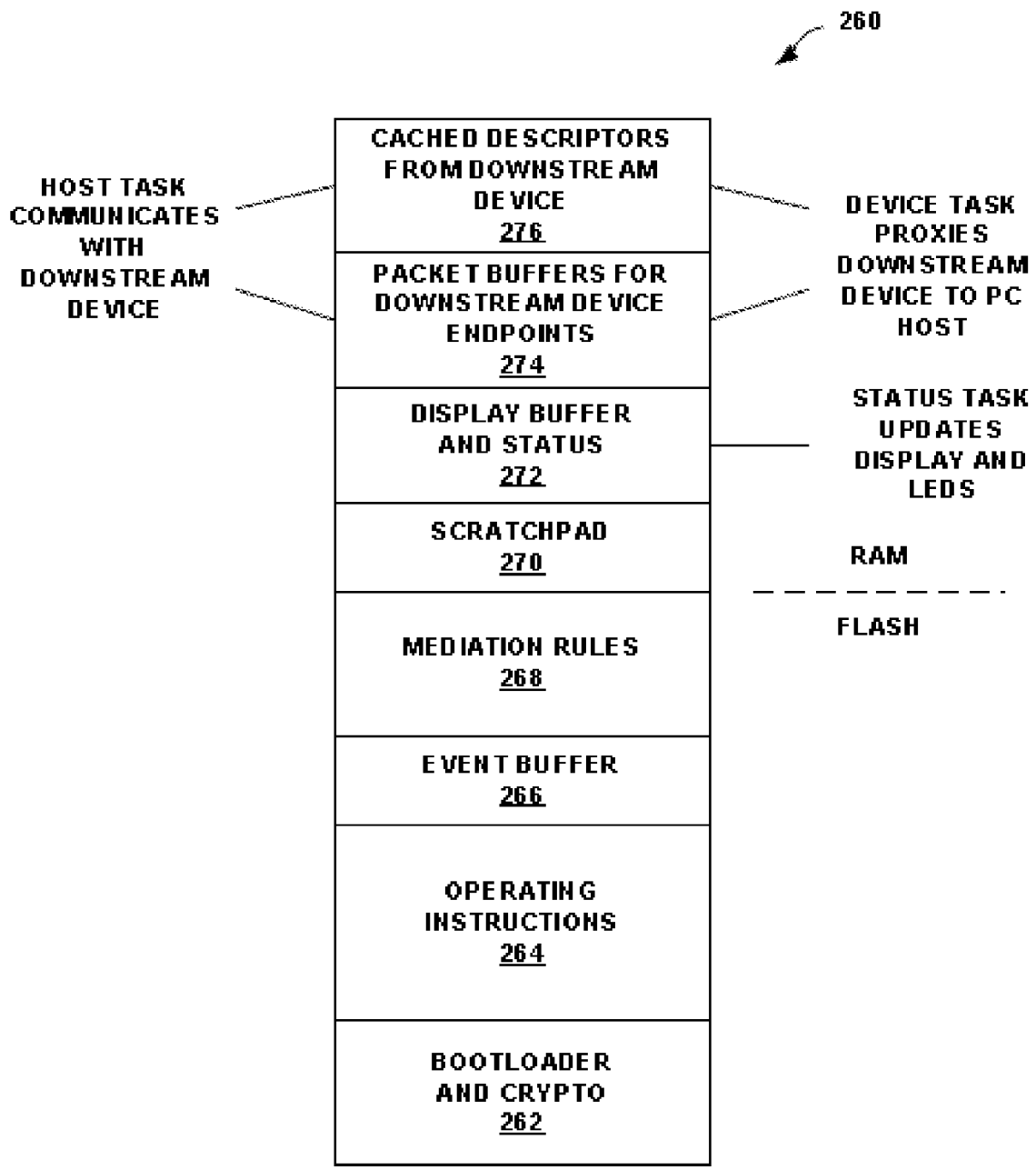
FIG. 1I is a block diagram illustrating an example firmware of a system for mediating communication between a USB device and a host computing device, in accordance with one example of this disclosure.

FIG. 1I is a block diagram illustrating an example firmware 260 of a system for mediating communication between a USB device and a host computing device, in accordance with one example of this disclosure. According to some aspects of the disclosure, firmware 260 may be used by mediation module 50 (FIGS. 1A-1E and 1G-1H), as well as mediation module library 162 (FIG. 1F).

In the example shown in FIG. 1I, firmware 260 operates using random access memory (RAM), as well as read-only flash memory. For example, firmware 260 includes certain components stored in flash memory, including a boot loader and associated cryptographic data 262, operating instructions 264, an event buffer 266, and mediation rules 268. In addition, firmware 260 includes certain components stored in RAM including a scratchpad 270, display buffer and status data 272, packet buffers for downstream device endpoints 274, and cached descriptors from downstream device 276. It should be understood that the components of firmware 160 shown in FIG. 1I are provided as merely one example. That is, firmware 160 may include fewer, additional, or alternative components than those shown in FIG. 1I.

According to some examples, boot loader and associated cryptographic data 262 may correspond to boot loader 90 shown and described with respect to FIG. 1B. That is, for example, boot loader and associated cryptographic data 262 may be responsible for boot up operations including checking for a valid operating firmware and passing control to operating instructions 264.

Operating instructions 264 may include programs and/or data structures for performing the mediating functions described herein. For example, operating instructions 264 may carry out certain functions ascribed to mediation module 50, such as determining whether a USB device 24 is authorized to communicate with host device 28, and/or whether a USB device 24 is properly communicating with host device 28.

Event buffer 266 may include the event log described with respect to FIG. 1B. That is, for example, event buffer 266 may be configured as a circular event log that tracks certain operating events. In some examples, event buffer 266 may store events related to rules updates (e.g., updates to mediation rules 268), USB device attach and detach events, and error/denial of service/forced shut off events. According to some aspects of the disclosure, events stored in event buffer 266 may include a time stamp to indicate when the events occurred.

Mediation rules 268 may include the rules used by mediation module 50 to determine whether a USB device 24 is authorized to communicate with host device 28, and/or whether a USB device 24 is properly communicating with host device 28. According to some aspects of the disclosure, mediation rules 268 may be changed or updated with a configuration file (FIG. 1H).

The remaining components of firmware 260 may be used by mediation module 50 during operation. For example, scratchpad 270 may be a relatively high speed memory used for temporary storage of calculations, data, and other work in progress. Display buffer and status data 272 may be used to provide one or more indications to a user regarding the operational status of mediation module 50, host device 28, and/or USB device 24. In some examples, display buffer and status data 272 may be associated with indicators 44 (FIG. 1A).

Packet buffers 274 may be used to buffer data being transmitted between USB device 24 and host device 28, while cached descriptors 276 may be used to determine whether a particular USB device 24 is authorized to communicate with host device 28. Again, it should be understood that firmware 160 is provided as merely one example, and that firmware for mediation module may include fewer, additional, or alternative components than those shown in FIG. 1I.

Figure 1J:
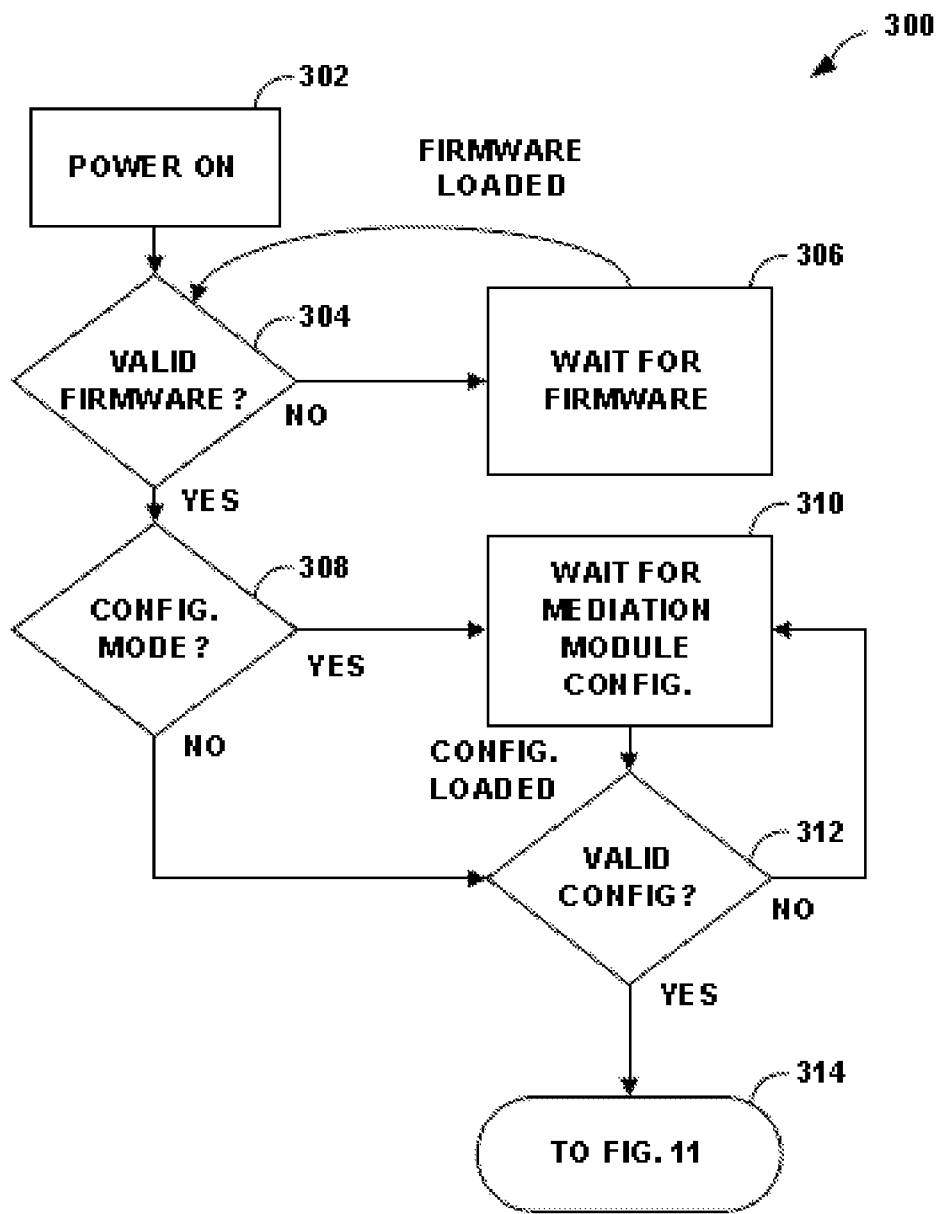
FIG. 1J is a flow diagram illustrating an example configuration operation of a system for mediating communication between a USB device and a host computing device, in accordance with one example of this disclosure.

FIG. 1J is a flow diagram illustrating an example method 300 of configuring a mediation module for mediating communication between a USB device and a host computing device, in accordance with one example of this disclosure. Although generally described as performed by the apparatus 20 and mediation module 50 shown in FIGS. 1A and 1B for purposes of explanation, it should be understood that other systems (e.g., mediation module library 162 shown in FIG. 1F) may also be configured to perform the method of FIG. 1J.

According to the example shown in FIG. 1J, method 300 begins by providing power to mediation module 50 (302). According to some aspects of the disclosure, upon power up, mediation module 50 initially checks for a valid firmware (304). For example, boot loader 90 may check for a valid operating firmware image to pass control to. If boot loader 90 does not detect a valid firmware image, mediation module 50 may wait for valid firmware to be loaded (306). That is, mediation module 50 may connect to host device 28 as an HID device and wait for a user to download a valid firmware.

Upon boot loader 90 detecting a valid firmware image (the "yes" branch of 304), mediation module 50 determines whether a configuration mode has been initiated (308). In some examples, a configuration mode can be used to load configuration files into mediation module 50. Mediation module 50 may determine whether a configuration mode has been initiated by determining if a user has booted mediation module while pressing pushbutton 76 (FIG. 1A). In another example, mediation module 50 may determine whether a configuration mode has been initiated by determining whether host device 28 has initiated a configuration mode.

If a configuration mode is active, mediation module 50 waits for one or more configuration files to be loaded into mediation module 50 (310). Upon loading of one or more configuration files, mediation module 50 may determine whether the configuration files are valid (312). For example, mediation module 50 may determine whether the configuration files are encrypted properly, or may perform other checks to ensure the authenticity of the configuration files. Returning to step 308, if configuration mode is not active, mediation module 50 may proceed directly to step 312 and determine whether configuration files stored on mediation module 50 are valid.

According to some aspects of the disclosure, after verifying that mediation module contains one or more valid configuration files, mediation module 50 is ready to begin mediating communication between a host device 28 and a USB device 24. That is, for example, mediation module 50 may proceed to the method of mediating communication shown and described with respect to FIG. 1K (314).

It should be understood that the steps shown and described with respect to FIG. 1J are provided as merely one example. That is, the steps of the method of FIG. 1J need not necessarily be performed in the order shown in FIG. 1J, and fewer, additional, or alternative steps may be performed.

Figure 1K:
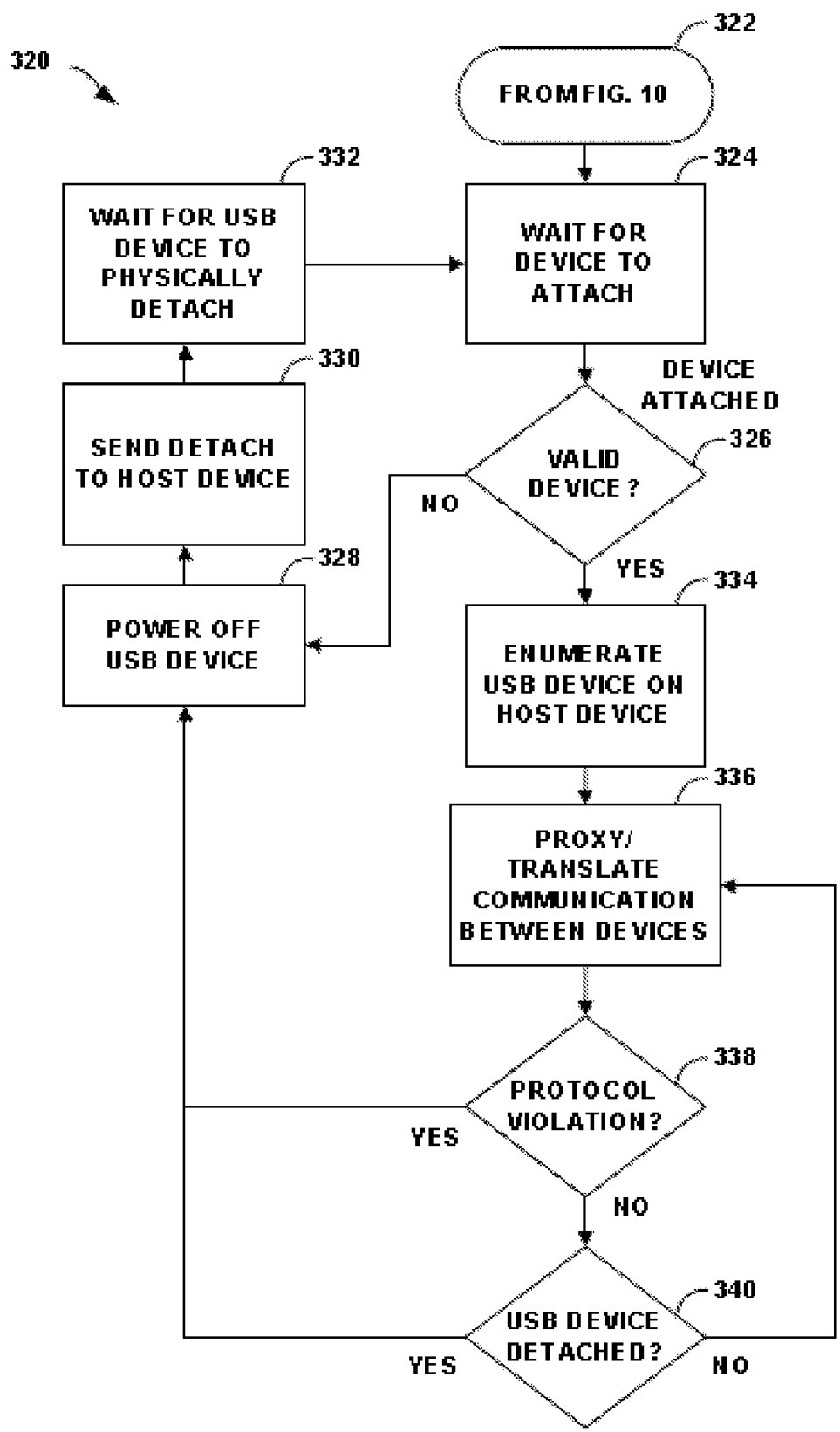
FIG. 1K is a flow diagram illustrating an example operation of a system for mediating communication between a USB device and a host computing device, in accordance with one example of this disclosure.

FIG. 1K is a flow diagram illustrating an example method 320 of mediating communication between a USB device and a host computing device, in accordance with one example of this disclosure. Although generally described as performed by the apparatus 20 and mediation module 50 shown in FIGS. 1A and 1B for purposes of explanation, it should be understood that other systems (e.g., mediation module library 162 shown in FIG. 1F) may also be configured to perform the method of FIG. 12.

According to some aspects of the disclosure, method 320 is performed after the configuration method 300 shown and described with respect to FIG. 1K (322). In other examples, method 320 need not follow another method.

Method 320 begins by waiting for a USB device 24 to attach to mediation module 50, for example, via USB host interface 56 (324). After USB device 24 has been attached to mediation module 50, mediation module 50 determines whether the USB device 24 is valid (326). That is, for example, mediation module 50 may determine whether USB device 24 is authorized to communicate with host device 28, as described elsewhere in this disclosure. In an example, mediation module 50 may compare data contained in a descriptor of USB device 24 to authorized descriptors listed in one or more configuration files 94 stored in memory 92.

If mediation module 50 determines that the attached USB device 24 is not valid or is not authorized to communicate with host device 28, mediation module 50 may power off USB device 24 (328). In addition, mediation module 50 may send a message to host device 28 indicating that the attached USB device 24 has been detached (i.e., powered off) (330). In some examples, mediation module 50 may also send a message to host device 28 indicating why the attached USB device was not authorized or to provide other information regarding the attached USB device 24 and/or the operations of mediation module 50. Mediation module 50 may then wait for a user to physically detach the USB device 24 (332). According to some examples, mediation module 50 may determine whether USB device 24 is physically attached by measuring capacitance using isolation module 48 (FIG. 1A). After the unauthorized USB device 24 has been detached, mediation module returns to step (324) and waits for a new USB device 24 to attach.

Returning to step (326), if mediation module 50 determines that the attached USB device 24 is valid and authorized to communicate with host device 28, mediation module 50 may enumerate USB device 24 on host device 28 (334). For example, mediation module 50 may present an idealized version of the USB device 24 that is attached to mediation module 50 to the host device 28. That is, if a user connects a storage device, such as a flash drive, to mediation module 50, mediation module 50 may present a storage device with the same descriptors, e.g., vendor ID, product ID, serial number, and the like, to host device 28.

In addition, mediation module 50 may act as a proxy to translate messages and commands between host device 28 and USB device 24 (336). For example, mediation module 50 may translate messages between USB device 24 and host device 28 without altering the contents of the packets that make up the messages. Rather, mediation module 50 may receive messages from the USB device 24 and forward the messages to host device 28. Likewise, mediation module 50 may receive messages from host device 28 and forward the messages to USB device 24. Thus, according to some aspects of the disclosure, the presence and operation of mediation module 50 is transparent to both USB device 24 and host device 28.

While translating commands and messages between host device 28 and USB device 24, mediation module may determine whether the commands and messages include any protocol violations (338). In an example, mediation module 50 may protect host device 28 against protocol attacks from USB device 24, such as eavesdropping, by only forwarding data to a USB device 24 if the data is addressed to USB device 24 by host device 28. That is, USB device 24 is prevented from receiving or copying any data from host device 28 that is not explicitly sent by host device 28 to USB device 24. If mediation module 50 detects a protocol violation, mediation module 50 returns to steps (328)-(332) to disable the USB device 24.

In addition to monitoring commands and messages between host device 28 and USB device 24 for protocol violations, mediation module 50 may also determine whether the USB device 340 has been detached (340). For example, mediation module 50 may determine whether the operating system of host device 28 loses the connection with USB device 24 (e.g., due to an error of the operating system or the USB device 24), or whether the USB device 24 has been physically detached from mediation module 50. If mediation module 50 determines that USB device 24 has been detached, mediation module 50 returns to steps (328)-(332) to disable the USB device 24. Otherwise, mediation module 50 returns to step (336) and continues to translate communication between host device 28 and USB device 24.

It should be understood that the steps shown and described with respect to FIG. 1K are provided as merely one example. That is, the steps of the method of FIG. 1K need not necessarily be performed in the order shown in FIG. 1K, and fewer, additional, or alternative steps may be performed.

Figure 1L:
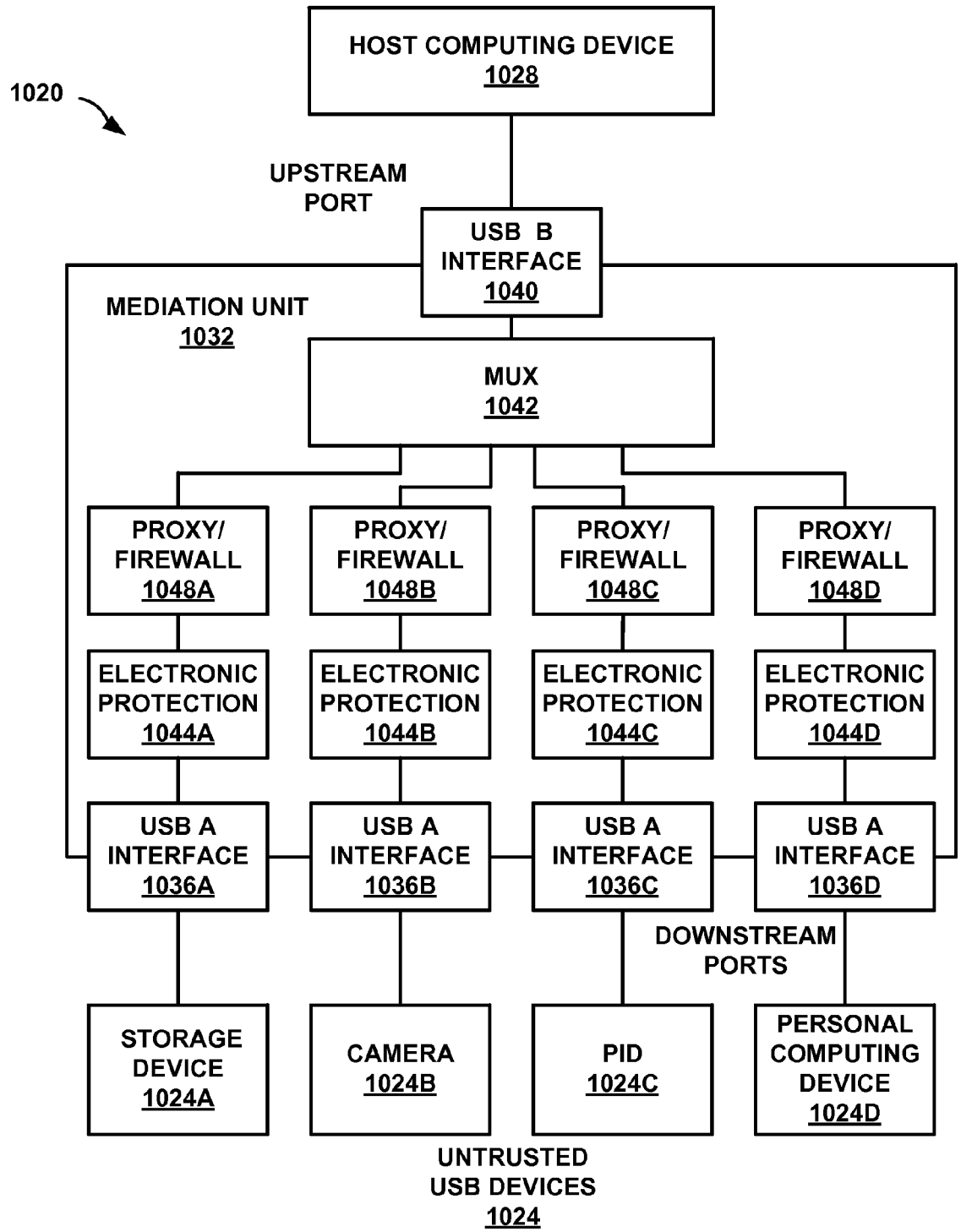
FIG. 1L is a block diagram illustrating an example system for mediating communication between a universal serial bus (USB) device and a host computing device, in accordance with techniques described in this disclosure.

FIG. 1L is a block diagram illustrating an example system 1020 for mediating communication between a number of untrusted universal serial bus (USB) devices 1024 and a host computing device 1028 by a mediation unit 1032, in accordance with one example of this disclosure.

In the example shown in FIG. 1L, untrusted USB devices 1024 include a storage device 1024A (e.g., a Flash drive, hard drive, or other mass storage device), a digital camera 1024B, a peripheral input device (PID) or Human Interface Device (HID) 1024C (e.g., a mouse, keyboard, or the like), and a personal computing device 1024D (e.g., mobile telephones, tablet computers, personal digital assistants (PDAs), video gaming devices, portable media players, e-readers, or a wide variety of other types of personal devices). It should be understood that USB devices 1024 are provided merely for purposes of illustration and may include a wide variety of other peripheral electronic devices. For example, USB devices 1024 may include a variety of display devices (e.g., a monitor), communication devices (e.g., a modem), audio devices (e.g., one or more speakers), or the like. This listing of USB devices 1024 is not intended to be exhaustive, and the techniques of this disclosure may be performed using a variety of other USB devices.

Host computing device 1028 may include any device that is capable of hosting any of USB devices 1024. That is, typically, host computing device 1028 includes a USB receptacle that is capable of receiving a USB plug associated with any of USB devices 1024, or vice versa. Examples of host computing device 1028 include a wide variety of computing devices, including desktop/laptop computers, personal computing devices, mobile telephones, electronic handheld devices, gaming consoles, or other electronic devices.

USB devices 1024 are configured to communicate with host computing device 1028 according to a common USB communication specification. USB device 1024 may, for example, communicate with host computing device 1028 according to the USB 2.0 specification, as revised on Jul. 26, 2010, available publicly at http://www.usb.org/developers/ docs/usb_1020_021411.zip, which is incorporated herein in its entirety by reference. In other examples, USB device 1024 and host computing device 1028 may be configured to communicate according to another USB specification, such as USB 3.0, released Nov. 12, 2008, available publically at http://www.usb.org/developers/docs/usb_30_ spec_020411d.zip, or other standards or proprietary communication specifications that are currently available or may emerge in the future. In addition, USB device 1024 may be powered by host computing device 1028. That is, for example, host computing device 1028 may include a power supply that powers USB device 1024 when USB device is connected to host computing device 1028.

Mediation unit 1032 operates as a USB firewall with respect to the USB communications between USB device 1024 and host computing device 1028. In the example of FIG. 1L, mediation unit 1032 includes USB "A" interfaces 1036A-1036D (collectively, USB A interfaces 1036), USB "B" interface 1040, and multiplexer ("MUX") 1042, electronic protection units 1044A-1044D, and proxy/firewall units 1048A-1048D. In other examples, as noted below, mediation unit 1032 may include more or fewer components than those shown in FIG. 1L.

USB A interfaces 1036 may provide a physical connection between mediation unit 1032 and USB devices 1024, while USB B interface may provide a physical connection between mediation unit 1032 and host computing device 1028. For example, USB A interfaces 1036 may be configured as a series "A" USB receptacle (for connection with type-A USB plugs from USB devices 1024), while USB B interface may be configured as a series "B" receptacle (for connection with a type-B plug from host computing device 1028). Multiplexer 1042 multiplexes signals for USB B interface, thereby allowing more than one USB device 1024 to be connected to mediation unit 1032.

Electronic protection units 1044 provide electronic protection from USB devices 1024 for host computing device 1028. For example, in some instances, host computing device 1028 may include certain integrated functions which prevent USB devices 1024 from drawing too much current by disabling the connection with USB devices 1024 if such a condition is detected. According to aspects of this disclosure, electronic protection units 1044 may replace such functionality of host computing device 1028. In this way, mediation unit 1032 may prevent USB devices 1024 from drawing more than specified by host computing device 1028 while maintaining a powered connection with host computing device 1028.

In another example, according to aspects of this disclosure, electronic protection units 1044 may protect host computing device 1028 from so-called overvoltage attacks. For example, in some instances, USB devices 1024 may place a voltage across data lines or power lines associated with the USB connection that exceeds a voltage that hardware of a host computing device 1028 can support. Electronic protection units 1044 may mitigate such overvoltage attacks by disconnecting USB devices 1024 or by failing before hardware of host computing device 1028 fails (e.g., thereby providing a sort of sacrificial buffer). In some examples, the protection against an overvoltage attack may be improved by separating device-side circuits of mediation unit 1032 from the host-side circuits of mediation unit 1032. In this way, mediation unit 1032 may prevent host computing device 1028 from receiving more than a specified amount of voltage from USB devices 1024 while maintaining a powered connection with host computing device 1028.

Electronic protection units 1044 may isolate host computing device 1028 from communication with USB devices 1024 in the event that USB devices 1024 are not authorized to communicate with host computing device 1028, or in the event that USB devices 1024 are malfunctioning or identified as being a potential security threat. For example, electronic protection units 1044 may be responsible for terminating power to USB devices 1024 in the event that USB devices 1024 are not authorized to communicate with host computing device 1028, or in the event that USB devices 1024 are malfunctioning or identified as being a potential security threat.

Electronic protection units 1044 may also determine whether devices, such as USB devices 1024 are connected to mediation unit 1032. For example, electronic protection units 1044 may determine whether a device is connected to mediation unit 1032 by measuring capacitance at USB A interfaces 1036. That is, electronic protection units 1044 may determine that there are no devices connected to mediation unit 1032 when measuring little or no capacitance at USB A interfaces 1036, and may determine that there are devices connected to mediation unit 1032 when measuring more than a nominal amount of capacitance.

One way in which USB devices 1024 may attempt to compromise host computing device 1028 is to logically disconnect from host computing device 1028 and reconnect as a different type of device. While this disconnect/reconnect cannot typically be reliably detected by host computing device 1028, electronic protection units 1044 detects this behavior and prevents attacks from such malicious devices. To do so, electronic protection units 1044 may sense disconnect events using capacitive sensing of a USB shield of USB devices (e.g., a metallic portion of a USB plug). In the event that a USB device does not have the USB shield, as a fail-safe approach, mediation unit 1032 may deny communication with such devices. In other examples, mediation unit 1032 may allow devices without shields only if the devices are of a particular device class or manufacturer. In still other examples, mediation unit 1032 may allow devices without shields if such devices are approved interactively (at connection time) by a user.

Proxy/firewall units 1048 may mediate communication between host computing device 1028 and USB devices 1024. In some examples, proxy/firewall units 1048 may transmit, or "proxy", messages between host computing device 1028 and USB devices 1024 without the devices being aware of the presence of proxy/firewall units 1048. For example, proxy/firewall units 1048 may perform packet processing operations to deliver messages to USB devices 1024 or host computing device 1028 as if proxy/firewall units 1048 were host computing device 1028 or USB devices 1024, respectively. In some examples, proxy/firewall units 1048 may process and/or generate header data (e.g., token packets), while leaving payload data unchanged.

Accordingly, host computing device 1028 may detect, or "see" mediation unit 1032 as a typical USB device, while USB devices 1024 may detect, or "see" mediation unit 1032 as a typical USB host. Thus, mediation unit 1032 may receive commands and messages from host computing device 1028 via USB B interface 1040 and transmit the commands and messages to USB devices 1024 via USB A interfaces 1036 as if mediation unit 1032 was host computing device 1028. In addition, mediation unit 1032 may receive commands and messages from USB device 1024 and transmit the commands and messages to host computing device 1028 as if mediation unit 1032 was USB device 1024.

According to aspects of this disclosure, proxy/firewall units 1048 may also provide a firewall for host computing device 1028 from USB devices 1024. For example, in operation, proxy/firewall units 1048 may be responsible for determining whether USB devices 1024 are authorized to communicate with host computing device 1028. Alternatively or additionally, proxy/firewall units 1048 may be responsible for determining whether USB devices 1024 are communicating properly with host computing device 1028. Accordingly, in general, proxy/firewall units 1048 may enable mediation unit 1032 to operate as a type of firewall device in that it permits or denies transmissions between host computing device 1028 and USB devices 1024 based upon a set of rules, and may be used to protect host computing device 1028 from unauthorized access by USB devices 1024 while permitting legitimate communications to pass.

To determine whether one of USB devices 1024 is authorized to communicate with host computing device 1028 (e.g., USB device 1024A for purposes of example), proxy/firewall units 1048 may initially examine an identifying characteristic associated with USB device 1024A. Proxy/firewall units 1048 may then determine whether USB device 1024A is authorized to communicate with host computing device 1024, for example, by comparing the identifying characteristic associated with USB device 1024A to a stored set of authorized identifying characteristics associated with authorized devices.

In some examples, proxy/firewall units 1048 may determine whether USB device 1024A is authorized to communicate with host computing device 1028 using one or more descriptors associated with USB device 1024A. For example, USB devices (such as USB devices 1024) commonly include and utilize one or more descriptors, which may provide a variety of identifying characteristics of the USB devices. In an example, a USB device descriptor may include information such as a USB revision with which the USB device complies, product identification data, vendor identification data, a serial number, and possible configurations of the USB device, and the like. Other descriptors include configuration descriptors, interface descriptors, endpoint descriptors, and string descriptors.

Proxy/firewall units 1048 may use any such descriptors to determine identifying characteristics associated with USB devices 1024 when determining whether USB devices 1024 are authorized to communicate with host computing device 1028. Moreover, proxy/firewall units 1048 may use any portion of data contained in the descriptors to determine identifying characteristics associated with USB devices 1024. In an example, a user of mediation unit 1032 may desire host computing device 1028 to communicate only with USB devices 1024 manufactured by one or more specific vendors. In this example, proxy/firewall units 1048 may store a list of the specific vendors for use during an authentication process.

In some examples, proxy/firewall units 1048 may store and read the identifying characteristics of authorized devices in a local memory (e.g., a non-volatile memory) of mediation unit 1032. In other examples, however, proxy/firewall units 1048 may access identifying characteristics from another source. For example, proxy/firewall units 1048 may access a database of identifying characteristics via a wired or wireless network connection (e.g., an intranet connection, and internet connect, and the like).

To authenticate USB devices 1024, upon connection to mediation unit 1032, proxy/firewall units 1048 may identify USB devices 1024 using vendor identification data included in device descriptors associated with USB devices 1024. Proxy/firewall units 1048 may then compare the vendor identification information included in the descriptor with the list of authorized vendors. If the vendor of a particular USB device (e.g., again, taking USB device 1024A as an example,) is not included in the authorized vendors, proxy/firewall units 1048 may prevent USB device 1024A from communicating with host computing device 1028. If the vendor of USB device 1024A is included in the authorized vendors, however, proxy/firewall units 1048 may allow USB device 1024A to communicate with host computing device 1028.

A user or system administrator may define authentication permissions based on a variety of other factors. For example, a user may determine that only a certain type of device (e.g., a display device, a communication device, an audio device, a storage device, a human interface device) is allowed to communicate with host computing device 1028. In this example, proxy/firewall units 1048 may store a list of authorized device types, and use such a list to authorize or reject USB devices when connected in the same way described above. In another example, a user may define specific USB devices 1024 that are allowed to communicate with host computing device 1028, for example, using serial numbers of USB devices 1024. In this example, proxy/firewall units 1048 may store a list of authorized serial numbers, and use such a list to authorize or reject USB devices when connected in the same way described above. Again, proxy/firewall units 1048 may use any or all of the information contained in descriptors associated with USB devices 1024 during the authentication process.

As noted above, if proxy/firewall units 1048 determine that a connected USB device 1024 is not authorized to communicate with host computing device 1028, proxy/firewall units 1048 may prevent the connected USB device 1024 from communicating with host computing device 1028. According to some aspects of the disclosure, for example, proxy/firewall units 1048 may remove power from USB devices 1024 using electronic protection units 1044. Proxy/firewall units 1048 may also send a message to host computing device 1028 indicating that authorization failed.

If proxy/firewall units 1048 determine that a connected USB device 1024 is authorized to communicate with host computing device 1028, proxy/firewall units 1048 may allow the connected USB device 1024 to communicate with host computing device 1028. That is, proxy/firewall units 1048 may transmit messages between the connected USB device 1024 and host computing device 1028 without altering the messages. For example, proxy/firewall units 1048 may receive messages from USB devices 1024 and forward the messages to host computing device 1028. Likewise, proxy/firewall units 1048 may receive messages from host computing device 1028 and forward the messages to one of USB devices 1024. Thus, according to some aspects of the disclosure, the presence and operation of proxy/firewall units 1048 (as well as electronic protection units 1044) is transparent to both USB devices 1024 and host computing device 1028.

As noted above, proxy/firewall units 1048 may also be responsible for enabling mediation unit 1032 to determine whether USB devices 1024 are communicating properly with host computing device 1028. That is, for example, proxy/firewall units 1048 may be responsible for verifying data transfers between host computing device 1028 and USB devices 1024. In an example, proxy/firewall units 1048 may protect host computing device 1028 against protocol attacks from USB devices 1024, such as eavesdropping, by only forwarding data to a USB device 1024 if the data is addressed to the USB device 1024 by host computing device 1028. That is, USB devices 1024 are prevented from receiving or copying any data from host computing device 1028 that is not explicitly sent to USB devices 1024 by host computing device 1028.

Proxy/firewall units 1048 may also protect against other protocol attacks, such as a denial of service attack. For example, USB devices 1024 are typically only required to send data to host computing device 1028 in response to a request by host computing device 1028. A malicious USB device, however, may send data to host computing device 1028 unbidden, i.e., not in response to a request. In addition, a malicious USB device may improperly identify itself when sending data to host computing device 1028. Proxy/firewall units 1048 may identify packets that are sent by USB devices 1024 at an improper time (e.g., before the packets have been requested) and disable USB devices 1024. In addition, proxy/firewall units 1048 may detect whether USB devices 1024 are identifying themselves appropriately, and disable USB devices 1024 that are not properly identifying themselves. That is, for example, proxy/firewall units 1048 may determine whether USB devices 1024 are sending the appropriate descriptor data to host computing device 1028, and disable, e.g., remove power from or otherwise cease communication with, USB devices 1024 if they are not using the appropriate descriptor data.

In addition, proxy/firewall units 1048 may protect host computing device 1028 against certain software based attacks. For example, proxy/firewall units 1048 may be capable of detecting malware propagation. That is, proxy/firewall units 1048 may monitor and analyze the contents of the packets communicated between USB devices 1024 and host computing device 1028 and identify malformed packets, or packets that contain known malware.

Proxy/firewall units 1048 may also protect host computing device 1028 against device emulation. For example, device emulation (also referred to as "device masquerading" or "re-enumeration") may occur when a USB device, such as one of USB devices 1024, declares its functionality to an operating system of host computing device 1028 when the USB device is first connected. The process of declaring a particular functionality after connection may be referred to as "enumeration." In some instances, the USB device may attempt to bypass USB authorization rules or operate as a device other than what is expected by the operating system. The USB device may perform a logical disconnect-and-reconnect, which may cause the operating system to re-enumerate the USB device. Upon re-enumeration the USB device may present itself to the operating system as a different type of device.

According to aspects of this disclosure, electronic protection units 1044 may detect when a disconnection is only logical (e.g., the data lines are disconnected) rather than physical (e.g., the USB device is disconnected from a socket that includes USB A interface 1036). Electronic protection units 1044 may signal proxy/firewall units 1048 to block the USB device until a physical disconnect event has occurred. In this way, proxy/firewall units 1048 may identify a change in the functionality of a connected USB device 1024 without the USB device 1024 being physically removed from a USB A interface of mediation unit 1032.

Upon detecting an attack or faulty USB device 1024, proxy/firewall units 1048 may prevent any unauthorized, unexpected, or malformed data (e.g., packets that do not conform to USB specification) from being transmitted to host computing device 1028. In addition, proxy/firewall units 1048 may cease communication with the attacking or faulty USB device 1024 (e.g., by causing electronic protection units 1044 to terminate power to USB devices 1024). According to some examples, as shown and described with respect to FIG. 6-8, certain functions described with respect to proxy/firewall units 1048, such as protecting host computing device 1028 from protocol or software based attacks, may be performed by one or more software modules that are executed by host computing device 1028.

In some examples, mediation unit 1032 may track certain operating events. For example, mediation unit 1032 may store an event log that includes events related to rules updates, USB device attach and detach events, and error/denial of service/forced shut off events. The events may, in some examples, be associated with a time stamp to indicate when the events occurred. In addition, in some examples, mediation unit 1032 verify a unique encryption key that is stored to mediation unit 1032 by a manufacturer of mediation unit 1032 upon power up of mediation unit 1032 to verify that mediation unit 1032 has not been tampered with. Mediation unit 1032 may also check for a valid operating firmware.

In this way, each downstream port of mediation unit 1032 (USB A interfaces 1036) is protected by logical and physical protection mechanisms. The logical protection mechanisms, e.g., proxy/firewall units 1048 enforce the USB standard, guard against USB-based exploits, watch for malicious behavior, and apply custom device-use policies. The physical protection mechanisms, e.g., electronic protection units 1044, protect host computing device 1028 from overvoltages and other electronic attacks. Electronic protection units 1044 also serve as physical connect/disconnect sensors that are used by proxy/firewall units 1048 to determine whether there is a USB device connected at USB A interfaces 1036.

Accordingly, in general, mediation unit 1032 may operate as a type of firewall device in that permits or denies transmissions between host computing device 1028 and USB device 1024 based upon a set of rules, and may be used to protect host computing device 1028 from unauthorized access while permitting legitimate communications to pass. As noted above, mediation unit 1032 may also be capable of protecting host computing device 1028 from software based attacks (e.g., device emulation, malware propagation, and the like), as well as protocol based attacks.

In addition, mediation unit 1032 physically separates USB devices 1024 and host computing device 1028, which may help to mitigate physical and hardware based attacks. That is, in addition to filtering communication and enforcing a USB standard between USB devices 1024 and host computing device 1028, by physically interposing mediation unit 1032 between USB devices 1024 and host computing device 1028, mediation unit 1032 may prevent physical attacks, such as voltage overloading by a rogue USB device 1024.

In the example of FIG. 1L, mediation unit 1032 can completely control communication between USB devices 1024 and host computing device 1028. As a result, mediation unit 1032 may protect host computing device 1028 from attacks against an operating system and core USB drivers of host computing device (as described in greater detail below), as well as other electronic attacks. In addition, mediation unit 1032 is platform independent and may operate with any host computing device 1028 that has USB support, regardless of the particular operating system of host computing device. Thus, mediation unit 1032 may be used with a variety of operating systems, embedded devices, or any other computing system.

As an independently operating device, malware operating on host computing device 1028 cannot disable or subvert mediation unit 1032. In some examples, the configuration of mediation unit 1032 may only be changed by an authorized administrator. For example, mediation unit 1032 may use authenticated, encrypted protocols to upgrade and configure the components of mediation unit 1032, so mediation unit 1032 cannot be reconfigured by an end user or by malware operating at host computing device 1028.

While host computing device 1028 is not protected from USB devices (such as USB devices 1024) that are not connected to host computing device 1028 through mediation unit 1032, in some examples, as described below with respect to FIG. 2, host computing device 1028 may disable devices that are not connected through mediation unit 1032. In some examples, host computing device may also support device policies. In an example for purposes of illustration, a particular keyboard and mouse may be connected directly to host computing device 1028, but any other device may need to be connected via mediation unit 1032 to be operational at host computing device 1028.

According to some aspects, certain policies or advanced processing may be offloaded to host computing device 1028 and simply facilitated by mediation unit 1032. Enforcement of particular malware scanning policies, such as requiring that USB storage device 1024A is scanned for malware before being attached to host computing device 1028, may be implementing by allowing host computing device 1028 (or another computing system) to perform the malware scanning and allow mediation unit 1032 to be an enforcer. For example, mediation unit 1032 may store data indicating that a particular storage device had been scanned and approved, as well as performing checks to ensure that the storage device has not been altered after approval.

It should be understood that the components of mediation unit 1032 are provided merely for purposes of example, and that mediation unit 1032 may include more or fewer components shown in FIG. 1L. For example, mediation unit 1032 may include a dedicated power source (or may be powered by host computing device 1028). Mediation unit 1032 may include encrypted data channels for routing data. Moreover, mediation unit 1032 may include certain anti-tamper and/or anti-reverse engineering mechanisms. For example, mediation unit 1032 may be enclosed in an anti-tamper or tamper-evident enclosure. Additionally or alternatively, mediation unit 1032 may be encased in an epoxy or other resin to prevent component removal or examination. Mediation unit 1032 may also be void of identifying marks, such as serial numbers or other common identifying marks on electronic components.

While mediation unit 1032 is shown in the example of FIG. 1L as a hub including four separate channels, in other examples, mediation unit 1032 may be differently configured. For example, mediation unit 1032 may be incorporated in a one-port mediation unit that may have approximately the form factor of a USB storage device (commonly referred to as "thumb drives"). Such a mediation unit 1032 may be connected to portable computers and/or embedded systems "in line" with the USB interface of the device.

Moreover, it should be understood that certain components shown in the apparatus 1020 of FIG. 1L may be highly integrated, but illustrated separately for conceptual purposes. That is, in other examples, certain components and/or modules shown in FIG. 1L (and elsewhere in this description) may be functionally integrated.

Figure 2:
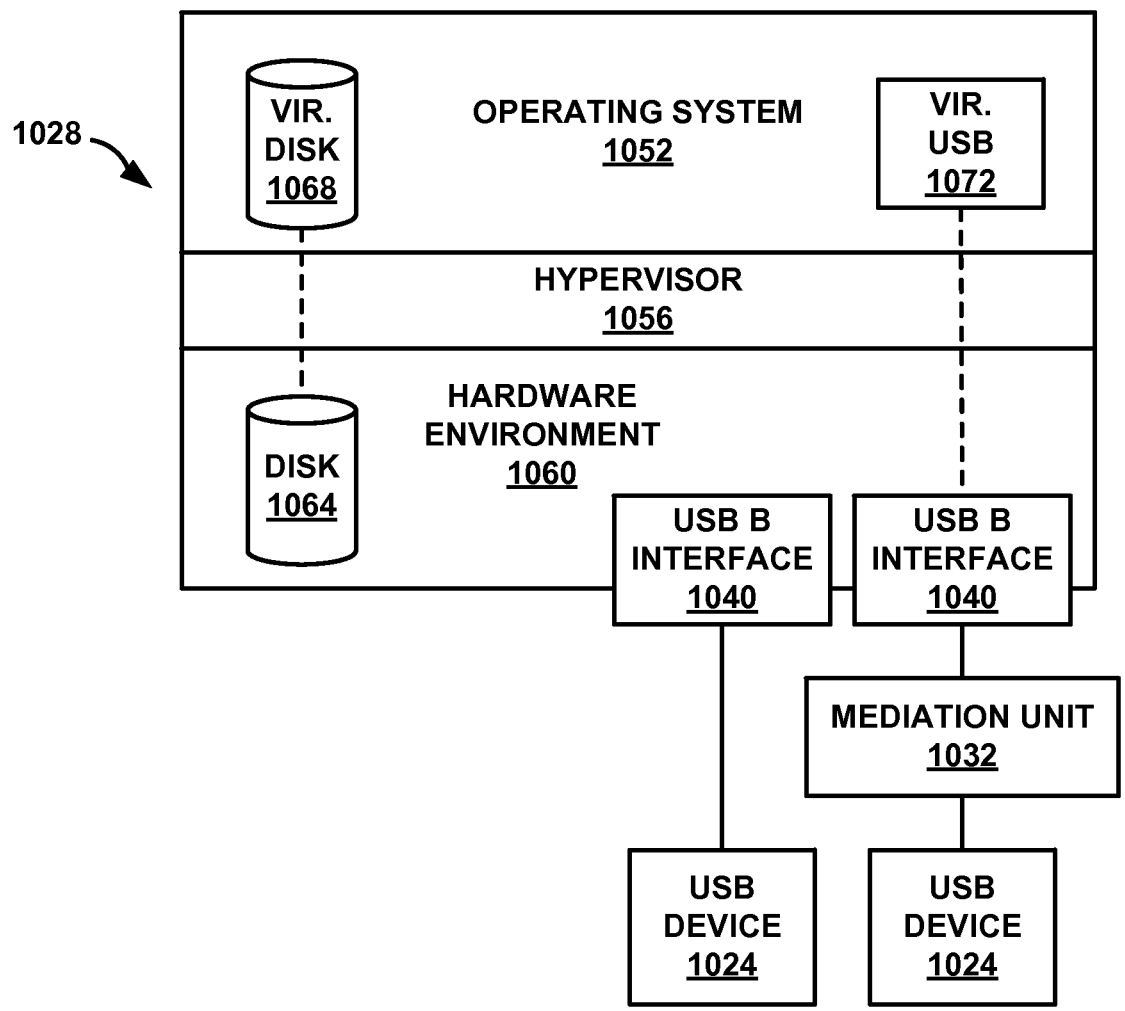
FIG. 2 is a block diagram illustrating another example system for mediating communication between a USB device and a host computing device, in accordance with techniques described in this disclosure.

FIG. 2 is a block diagram illustrating another example system for mediating communication between a USB device and a host computing device. According to some aspects of this disclosure, certain features and components of the system shown in FIG. 2 may be similar to those shown and described with respect to FIG. 1L. It should be understood that the techniques for mediating communication described with respect to FIG. 2 may be performed by a variety of other systems, having more or fewer components than those shown in FIG. 2.

In the example shown in FIG. 2, host computing device 1028 includes an operating system 1052, a hypervisor 1056, and hardware 1060. Operating system 1052 may control the operation of components of host computing device 1028. For example, operating system 1052, in one example, facilitates the interaction of applications (e.g., program instructions and/or data that are executable by host computing device 1028) with one or more processors of host computing device 1028 (e.g., a central processing unit (CPU) and/or graphics processing unit (GPU) of host computing device 1028), volatile and non-volatile memory of host computing device 1028 (e.g., disk 1064), and input and output devices (such as USB devices 1024).

Hardware environment 1060 provides an operating environment for executing hypervisor 1056. Although not shown in detail, hardware environment 1060 (as well as the hardware environments of other computing devices shown herein) may include not only disk 1064 and USB B interfaces 1040 as illustrated, but also one or more programmable processors (e.g., general- or special-purpose processors, ASICs, controllers, and so forth), main memory in the form of, e.g., random-access memory (RAM) such as dynamic and/or static RAM, non-volatile storage such as disk 1064, and a network interface, the components of hardware environment 1060 being interconnected via at least one bus.

In general, hypervisor 1056, which may also be referred to as a virtual machine manager ("VMM") or virtualization manager, may present one or more guest operating systems, e.g., operating system 1052, with a virtual operating platform and may manage execution of the guest operating systems. A "guest operating system" as used herein is in some cases a synecdoche for a "guest virtual machine" (not shown in FIG. 2) managed by hypervisor 1056. In general, a virtual machine (again, not shown in FIG. 2) managed by hypervisor 1056 is a software implementation of a machine that provides a virtual architecture over a hardware environment (illustrated as hardware 1060 in FIG. 2). Accordingly, a guest virtual machine hosted by host computing device 1028 may execute a guest operating system as well as one or more user applications managed by the guest operating system. For ease of illustration and description, however, the techniques are primarily described herein with respect to a guest operating system.

Host computing device 1028 may be referred to as a "host," while each virtual machine may be referred to as a guest virtual machine or more simply as a "guest." Native hypervisors (e.g., referred to as Type 1) such as that illustrated by FIG. 2 may operate directly on the host's hardware to control the hardware and to manage guest operating systems. In this case, a guest operating system may operate on a level above the hypervisor. Hosted hypervisors (e.g., referred to as Type 2) operate within a conventional operating system environment, with the hypervisor layer as a distinct second software level. In this case, a guest operating system may operate on a third level above the hardware. Example hosted hypervisors include VirtualBox available from VMWare, Xen, Hyper-V available from Microsoft Corporation, and Kernel-based Virtual Machine (KVM).

In the example of FIG. 2, hypervisor 1056 may manage a hard disk 1064 of hardware 1060 by presenting a virtual hard disk 1068 to operating system 1052. Likewise, hypervisor 1056 may manage USB B interfaces 1040 by presenting a virtual USB device 1072 to operating system 1052.

According to some aspects of the disclosure, certain functions of hypervisor 1056 may depend on mediation unit 1032. In an example, hypervisor 1056 may present a virtual USB device 1072 to operating system 1052 only if the USB device 1024 connected to USB B interface 1040 is connected using mediation unit 1032. That is, hypervisor 1056 may not present a USB device 1024 to operating system 1052 for interaction with operating system 1052 unless the USB device 1024 is connected to USB B interface 1040 via mediation unit 1032. Rather, hypervisor 1056 simply ignores the connected USB device 1024, such that a user cannot access the USB device 1024 using operating system 1052.

Figure 3:
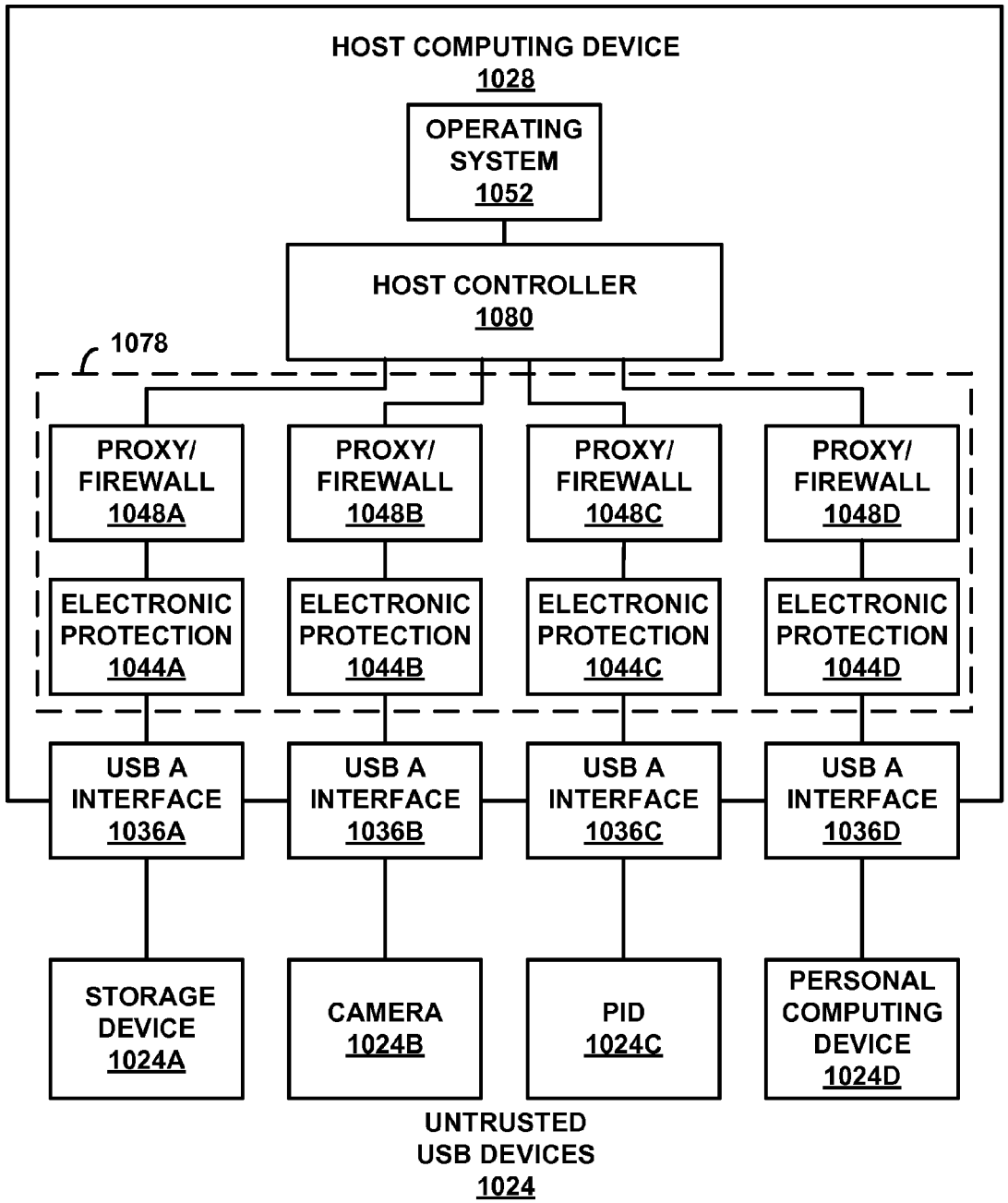
FIG. 3 is a block diagram illustrating another example system for mediating communication between a USB device and a host computing device, in accordance with techniques described in this disclosure.

FIG. 3 is a block diagram illustrating another example system for mediating communication between one or more USB devices 1024 and host computing device 1028. According to some aspects of this disclosure, certain features and components of the system shown in FIG. 3 may be similar to those shown and described with respect to FIG. 1L. It should be understood that the techniques for mediating communication described with respect to FIG. 3 may be performed by a variety of other systems having more or fewer components than those shown in FIG. 3.

The example of FIG. 3 includes USB devices 1024 and host computing device 1028, which includes USB A interfaces 1036, electronic protection units 1044, proxy/firewall units 1048 (incorporated as mediation unit 1078), a host controller 1080, and operating system 1052. Thus, in the example of FIG. 3, mediation unit 1078 is incorporated directly in host computing device 1028. That is, for example, a manufacturer of host computing device 1028 (or one or more components of host computing device 1028 such as a motherboard) may integrate mediation unit 1078 into hardware or software associated with host computing device 1028 at the time of manufacture or assembly. Thus, any USB devices 1024 connected to host computing device 1028 may be mediated by mediation unit 1078.

Mediation unit 1078 may include logic that carries out the functions ascribed to mediation unit 1032 shown in FIG. 1L. For example, mediation unit 1078 may be responsible for determining whether a USB device, such as USB devices 1024, is authorized to communicate with operating system 1052 of host computing device 1028. Alternatively or additionally, mediation unit 1078 may be responsible for determining whether USB devices 1024 are communicating properly with operating system 1052. Other features of mediation unit 1078 may also be similar to, or the same as the features described with respect to mediation unit 1036 shown and described with respect to FIG. 1L.

Host controller 1080 may be used control the flow of data between USB devices 1024 and operating system 1052. For example, host controller 1080 may be configured as a USB host controller that supports one or more USB devices 1024. In general, host controller 1080 may be compatible with a variety of USB specifications and may use a variety of different host controller interfaces (e.g., Open Host Controller Interface (OHCI), Universal Host Controller Interface (UHCI), Enhanced Host Controller Interface (EHCI), Extensible Host Controller Interface (XHCI), or the like) to communicate with a driver of operating system 1052. Host controller 1080 may be incorporated with a variety of microprocessors, digital signal processors (DSPs), application specific integrated circuits (ASICs), field programmable gate arrays (FPGAs), or any other equivalent integrated or discrete logic circuitry, as well as any combinations of such components.

In the example of FIG. 3, mediation unit 1078 is disposed between USB A interfaces 1036 and host controller 1080. Accordingly, mediation unit 1078 is positioned to intercept messages from USB devices 1024 and pass the messages to host controller 1080. As noted above with respect to mediation unit 1036, the operation of mediation unit 1078 is transparent with respect to both USB devices 1024 and host controller 1080. Thus, mediation unit 1078 may determine whether USB devices 1024 are is authorized to communicate with operating system 1052 and/or communicating properly with operating system 1052 without operating system 1052 and/or USB devices 1024 detecting the presence of mediation unit 1078.

Accordingly, the example of FIG. 3 may be similar to the example shown in FIG. 1L, however, in the example of FIG. 3, mediation unit 1078 is integrated with host computing device 1028, e.g., as components on a motherboard of host computing device 1028. Such a configuration offers the same functionality as mediation unit 1032 without needing a separate hardware device. Mediation unit 1078 cannot be bypassed without installing new hardware that supplies additional (unprotected) USB ports. In addition, mediation unit 1078 may be used with USB devices 1024 that require a direct connection with host computing device 1028. While mediation unit 1078 may not be initially configured to support all devices, additional firmware development may provide for an expanded set of supported USB device types.

Figure 4:
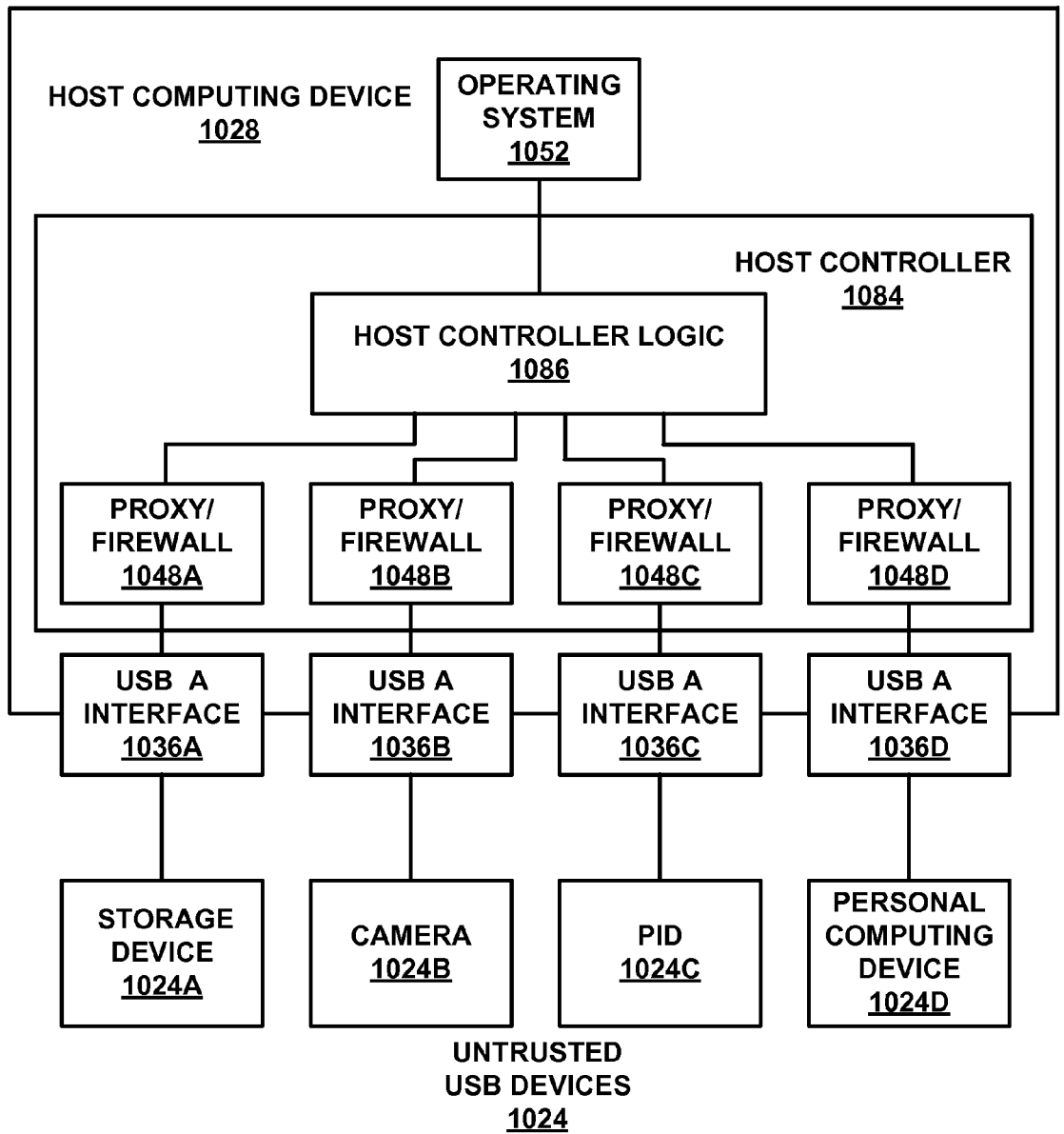
FIG. 4 is a block diagram illustrating another example system for mediating communication between a USB device and a host computing device, in accordance with techniques described in this disclosure.

FIG. 4 is a block diagram illustrating another example system for mediating communication between one or more USB devices 1024 and host computing device 1028. According to some aspects of this disclosure, certain features and components of the system shown in FIG. 4 may be similar to those shown and described with respect to FIGS. 1-3. It should be understood that the techniques for mediating communication described with respect to FIG. 4 may be performed by a variety of other systems having more or fewer components than those shown in FIG. 4.

The example of FIG. 4 includes USB devices 1024 and host computing device 1028, which includes USB A interfaces 26, operating system 1052 and a host controller 1084. Host controller 1084 includes proxy/firewall units 1048 and host controller logic 1086. Thus, in the example of FIG. 4, the functions of proxy/firewall units 1048 (e.g., such as protecting against protocol attacks), device emulation, and/or malware propagation, as described with respect to FIG. 1L.) are incorporated directly in host controller 1084. That is, for example, a manufacturer of host controller 1084 may integrate proxy/firewall units 1048 into hardware or software associated with host controller 1084 at the time of manufacture. Thus, any USB devices 1024 relying on host controller 1084 to communicate with a computing device, such as host computing device 1028, may be mediated by proxy/firewall units 1048.

Host controller 1084 may be configured similarly to and perform the same functions as host controller 1080 shown in FIG. 3. That is, host controller 1084 may be used control the flow of data between USB devices 1024 and operating system 1052. Host controller 1084 includes host controller logic 1086 may include any combination of hardware and/or software for controlling the flow of data between USB devices 1024 and operating system 1052. In some examples, host controller 1084 (and host controller logic 1086) may be a discrete chip, a component of a south bridge or platform controller, or a component of a system-on-a-chip (SOC).

According to aspects of this disclosure, host controller 1084 includes proxy/firewall units 1048A. In general, proxy/firewall units 1048 may incorporate any combination of hardware (e.g., microprocessors, digital signal processors (DSPs), application specific integrated circuits (ASICs), field programmable gate arrays (FPGAs), or any other equivalent integrated or discrete logic circuitry, as well as any combinations of such components) and/or software for mediating data. For example, proxy/firewall units 1048 may include logic that carries out the functions ascribed to proxy/firewall units 1048 shown in FIG. 1L. Thus, proxy/firewall units 1048 may mediate connection to and communication with USB devices 1024.

In the example of FIG. 4, proxy/firewall units 1048 are directly integrated into host controller 1084. That is, for example, a manufacturer of host controller 1084 may integrate proxy/firewall units 1048 into hardware or software associated with host controller 1084 at the time of manufacture. Thus, any computing device incorporating host controller 1084 (such as host computing device 1028) also receives proxy/firewall units 1048, and any USB devices 1024 connected to host controller 1084 may be mediated by proxy/firewall units 1048. In some examples, proxy/firewall units 1048 may be implemented as an "IP Macro" for use in FPGA and ASIC chips.

Despite the integration of proxy/firewall units 1048, host controller 1084 may be configured to operate as a typical host controller and adhere to the USB specifications, except where modified to integrate with the proxy/firewall units 1048 or otherwise improve the security of host controller 1084. For example, the operation of proxy/firewall units 1048 is transparent when analyzing traffic, possibly maintaining some degree of state, and dropping or normalizing "unacceptable" traffic. In this example, there are no operating system-specific drivers for host controller 1084 and integrated proxy/firewall units 1048. Accordingly, host controller 1084 may remain compatible with the appropriate USB specifications and otherwise operate as a typical USB host controller (as noted above with respect to FIG. 3).

Proxy/firewall units 1048 may be responsible for determining whether USB devices are authorized and communicating appropriately with operating system 1052. In some examples, proxy/firewall units 1048 may be tailored to perform a particular subset of functions, and the subset of functions may depend on an amount of logic of proxy/firewall units 1048 that is in host controller 1084. For example, host controller 1084 and proxy/firewall units 1048 may only be configured to perform general purpose protections such as enforcing USB protocol and preventing data snooping on the bus, but not perform configurable device policies. In other examples, host controller 1084 may be configured to perform additional mediation tasks, such as verifying data transfers and providing protection against software based attacks (e.g., device emulation, malware propagation, and the like).

By integrating proxy/firewall units 1048 in host controller 1084, the mediation techniques may not be bypassed without installing new hardware that supplies additional (unprotected) USB ports. In addition, proxy/firewall units 1048 do not require an external device or additional hardware. Internal logic of common host controllers is transparent to a host computer, such as host computing device 1028 and host controllers may be interchangeable components. Accordingly, the mediation techniques described with respect to FIG. 4 may be integrated into future computing systems with little to no difficulty, thereby increasing adoption.

In some instances, the techniques described with respect to FIG. 3 and FIG. 4 may be hybridized such that some mediation components are integrated into a host controller (such as host controller 1080 or 1084) and some mediation components are included on a motherboard of host computing device 1028. For example, the logical components of a mediation unit may be integrated into a host controller, while physical electronic protection components (such as those described with respect to electronic protection units 1044) may be integrated into a motherboard.

Figure 5:
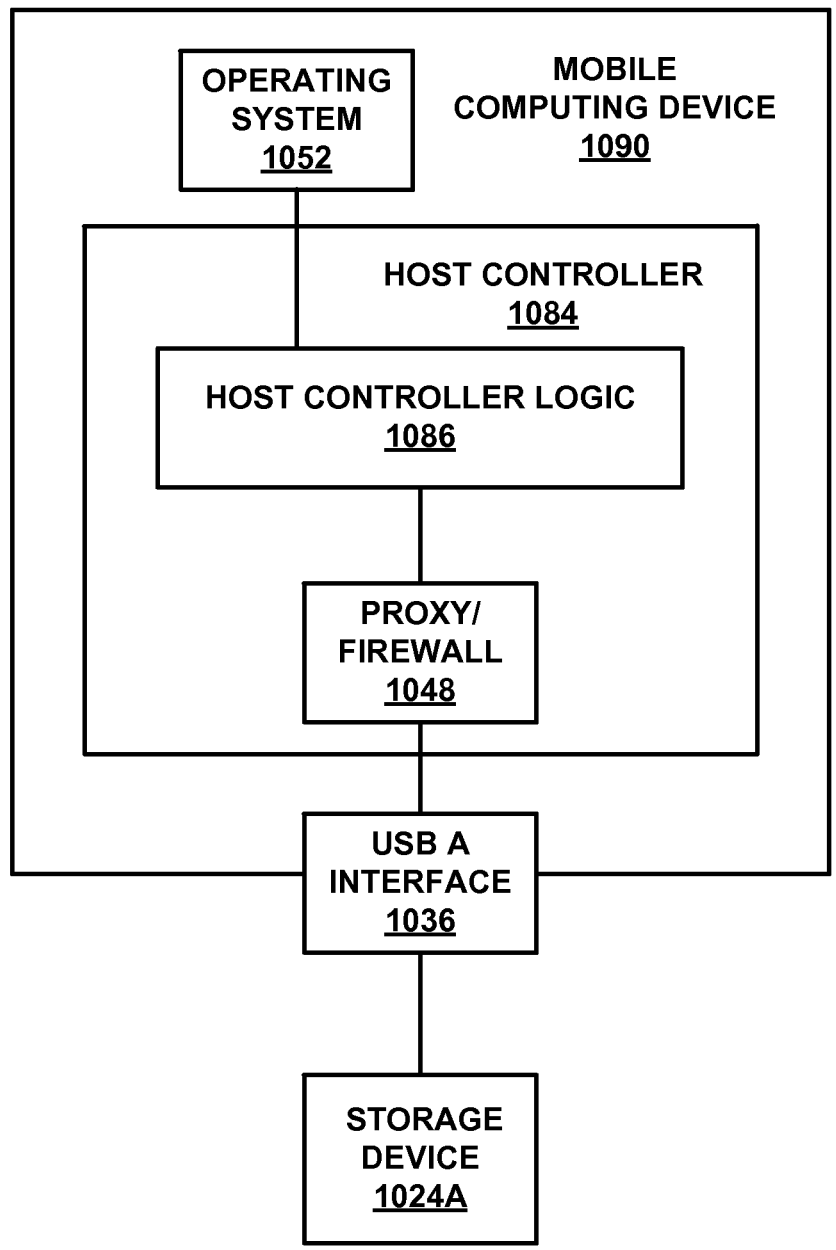
FIG. 5 is a block diagram illustrating another example system for mediating communication between a USB device and a host computing device, in accordance with techniques described in this disclosure.

FIG. 5 is a block diagram illustrating another example system for mediating communication. For example, FIG. 5 illustrates a particular application of the system shown in FIG. 4 in which USB A interface 1036, operating system 1052, and host controller 1084 are included in a mobile computing device 1090. Examples of mobile computing device 1090 can include, but are not limited to, portable or mobile devices such as cellular phones (including so-called "smartphones"), tablet computers, personal digital assistance (PDAs), portable gaming devices, portable media players, and e-book readers. Thus, host controller 1084 and host controller logic 1086 may be used control the flow of data between USB device 1024A and operating system 1052. Host controller 1084 may, in some instances, may be a highly integrated, semi-custom SOC that includes a USB host controller (and device) logic.

In addition, as noted above with respect to FIG. 4, host controller 1084 includes proxy/firewall units 1048A, such that proxy/firewall units 1048 are directly integrated into host controller 1084. For example, a manufacturer of mobile computing device 1090 and/or host controller 1084 may integrate proxy/firewall units 1048 into hardware or software associated with mobile computing device 1090 and/or host controller 1084 at the time of manufacture.

In some instances, mobile computing device 1090 may use a modified USB standard for communication with USB devices such as storage device 1024A. For example, some smartphones use a USB On The Go protocol, which enables a single port to act as host or device. In such an example, proxy/firewall unit 1048 may be extended to protect mobile computing device 1090 from against malicious hosts as well as devices.

In the example of FIG. 5, an application executed by mobile computing device 1090 may be used to interact with proxy/firewall unit 1048 to provide feedback and control.

Figure 6:
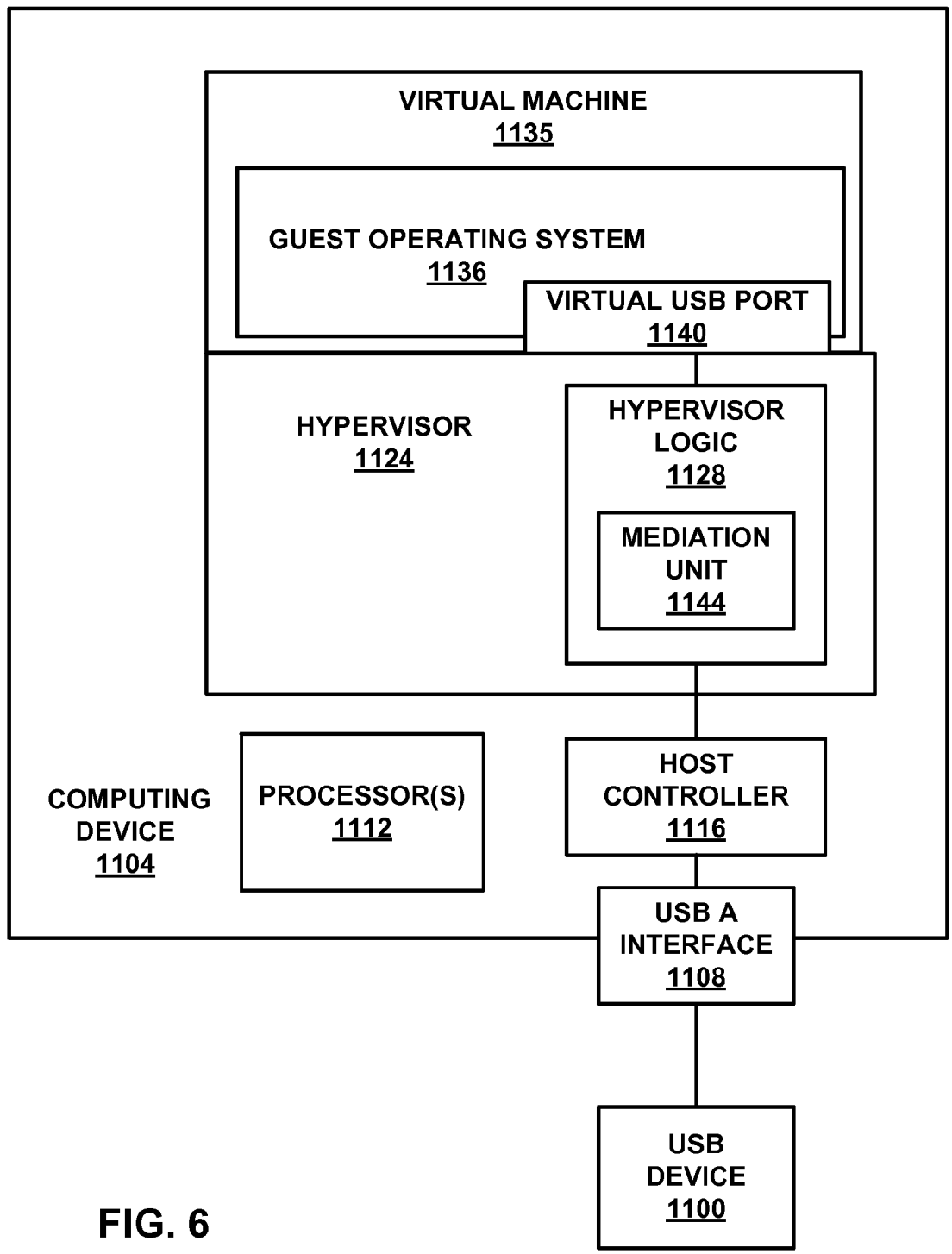
FIG. 6 is a block diagram illustrating another example system for mediating communication between a USB device and a host computing device, in accordance with techniques described in this disclosure.

FIG. 6 is a block diagram illustrating an example system for mediating communication between a USB device 1100 and a computing device 1104. In the example of FIG. 6, host computing device 1104 includes a USB A interface 1108, one or more processors 1112, a host controller 1116, and a hypervisor 1124. Hypervisor 1124 includes hypervisor logic 1128 having mediation unit 1144, a guest operating system 1136, and a virtual USB port 1140.

For example, USB device 1100 may include any previously described USB device including. That is, USB device 1100 may include mass storage class devices (e.g., including optional write-blocking features), human interface device (HID) class devices, printer class devices, audio class devices (e.g., audio headsets and microphones), communications device class (CDC) devices, video devices (e.g., webcams), imaging devices (e.g., cameras or scanners), handheld devices (e.g., personal media players (PMP), gaming consoles, mobile communications devices), and other USB devices (e.g., a wireless dongle, a FLEXlm licensing dongle, and the like).

USB A interface 1108 may be configured similarly to USB A interfaces 1036. For example, USB A interfaces 1108 may be configured as a series "A" USB receptacle for connection with type-A USB plugs.

Processors 1112, in one example, are configured to implement functionality and/or process instructions for execution within computing device 1104. For example, processors 1112 may be capable of processing instructions stored in memory 120, described below. Processors 1112 may include, for example, one or more microprocessors, digital signal processors (DSPs), application specific integrated circuits (ASICs), field programmable gate arrays (FPGAs), discrete logic, or any combinations thereof. Additionally, the functions attributed to processors 1112 in this disclosure may be embodied as software, firmware, hardware or any combination thereof.

Host controller 1116 may be configured similarly to host controller 1080 (FIG. 3). For example, host controller 1116 may be configured as a USB host controller that supports communication with one or more USB devices, such as USB device 1100. Host controller 1116 may be incorporated with a variety of microprocessors, digital signal processors (DSPs), application specific integrated circuits (ASICs), field programmable gate arrays (FPGAs), or any other equivalent integrated or discrete logic circuitry, as well as any combinations of such components.

Hypervisor 1124 may be based on one or more existing hypervisors, such as Xen or VirtualBox hypervisor packages and includes hypervisor logic 1128 a virtual USB port 1140, and a mediation unit 1144. In some instances, hypervisor 1124 may be stored to a memory including any combination of volatile or non-volatile storage. For example, the memory may include computer-readable storage medium that is configured to store information within computing device 1104 during operation. Accordingly, the memory may also be considered "non-transitory," despite storing data that can change over time. That is, for example, the term "non-transitory" may indicate that the storage medium is not embodied in a carrier wave or a propagated signal. The memory may include volatile memory (e.g., random access memories (RAM), dynamic random access memories (DRAM), static random access memories (SRAM), and other forms of volatile memories known in the art) and/or non-volatile memory (e.g., Flash memories, or forms of electrically programmable memories (EPROM) or electrically erasable and programmable (EEPROM) memories).

In general, hypervisor logic 1128 includes logic for virtualizing devices at guest operating system 1136. In some examples, hypervisor 1124. Hypervisor 1128 may provide a virtual operating platform by way of virtual machine 1135 that presents a virtualized version of hardware to guest operating system 1136.

Guest operating system 1136 is an operating system that is controlled by and operates at a less privileged level or role than hypervisor 1124. Guest operating system 1136 may control the operation of components of computing device 1104. For example, guest operating system 1136 may facilitate the interaction of applications (e.g., program instructions and/or data that are executable by computing device 1104) with processors 1112 and input and output devices (such as USB device 1100). As a guest of hypervisor 1124, guest operating system 1136 is only aware of devices that have been virtualized by hypervisor 1124. That is, guest operating system 1136 may be unable to interact with any devices that have not been virtualized by a virtual machine managed by hypervisor 1124. Thus, guest operating system 1136 may only communicate with USB device 1100 if hypervisor 1124 virtualizes virtual USB port 1140 at guest operating system 1136.

In the example of FIG. 6, mediation unit 1144 is included in hypervisor logic 1128. In some examples, mediation unit 1144 may be incorporated in hypervisor 1124 as a modification to hypervisor logic 1128, which may be typically responsible for making USB hardware available to guest operating system 1136. An end user or a system administrator may install mediation unit 1144 as a component of hypervisor 1124, where hypervisor 1124 represents the primary operating system on computing device 1104. In such examples, the user-visible operating system (e.g., such as a Windows® (available from Microsoft Corp.) or Unix-variant operating system such as Berkeley Standard Distribution (BSD) or Linux), shown in FIG. 6 as guest operating system 1136) is then installed as a guest of the primary operating system. Thus, mediation unit 1144 may be an extension to existing hypervisor logic 1128 that presents the physical USB A interface 1108 as virtual USB port 1140 to guest operating system 1136. Hypervisor 1124 may otherwise be unmodified and may be used for other virtualization.

According to aspects of this disclosure, mediation unit 1144 of hypervisor 1124 may be configured to perform the mediation techniques described in this disclosure. For example, mediation unit 1144 may perform functions attributed to proxy/firewall units 1048 above to carry out the mediation/firewall techniques. Mediation unit 1144 may control communications between physical USB ports (e.g., such as USB A interface 1108) and virtual USB ports (e.g., such as virtual USB port 1140). That is, mediation unit 1144 may receive messages from host controller 1116 and may pass the messages to guest operating system 1136 via virtual USB port 1140. In addition, mediation unit 1144 receives messages from guest operating system 1136 via virtual USB port 1140 and passes the messages to host controller 1116 for USB 1100.

In some examples, mediation unit 1144 may access one or more configuration files stored to a memory of computing device 1104 that identify USB devices that are authorized to communicate with computing device 1104. That is, for example, mediation unit 1144 may access one or more configuration files that include lists of identifying characteristics of authorized devices. Mediation unit 1144 may also access data that allows mediation unit 1144 to identify malware or other harmful code.

For example, according to some aspects of the disclosure, mediation unit 1144 may validate that attached device's descriptors and verify that the device is authorized by comparing the attached device's descriptors to a set of authorized descriptors stored in memory 120. Mediation unit 1144 may use any portion of data contained in the descriptors to determine whether a particular device is authorized to communicate with computing device 1104.

If the connected device is not authorized to communicate with computing device 1104, mediation unit 1144 may remove (or "de-virtualize") USB device 1100 from virtual USB port 1140. Removal of the USB device 1100 may include unmounting the USB device 1100 from a file system of guest operating system 1136 according to a device model for the guest operating system 1136. According to some aspects of the disclosure, mediation unit 1144 may keep USB device 1100 from being virtualized until the unauthorized attached device has been physically disconnected from computing device 1104.

If the connected device is authorized to communicate with computing device 1104, as noted above, mediation unit 1144 may enumerate the connected device by virtualizing the device at guest operating system 1136. After enumeration, mediation unit 1144 remains transparent to guest operating system 1136. For example, mediation unit 1144 may present an idealized version of the USB device that is attached to computing device 1104. That is, if a user connects a storage device, such as a Flash drive, to computing device 1104, mediation unit 1144 may virtualize a storage device with the same descriptors, e.g., vendor ID, product ID, serial number, and the like, to guest operating system 1136. Mediation unit 1144 may proxy data and commands exchanged between guest operating system 1136 and USB device 1100. For example, when guest operating system 1136 sends a command to USB device 1100, mediation unit 1144 may pass the command downstream to USB device 1100. Similarly, when USB device 1100 sends a command to guest operating system 1136, mediation unit 1144 may pass the command upstream to guest operating system 1136.

In some examples, mediation unit 1144 may perform real-time monitoring and checking of the attached device's USB descriptors and filter potentially dangerous commands. For example, one known way for a USB device to interfere with the proper operation of computing device 1104 (e.g., initiate a "blue screen" of a computing device using the Windows® operating system) is for an HID USB device (e.g., a keyboard, a mouse, and the like) to return incorrectly formatted report data to the host computing device. In this example, mediation unit 1144 may always virtualize an ideal HID USB device to guest operating system 1136, while also checking and handling malformed or incorrectly processed commands.

In some examples, mediation unit 1144 may implement a number of device use policies. For example, mediation unit 1144 may be configured to virtualize a predetermined set of USB devices. In an example for purposes of illustration, mediation unit 1144 may specifically exclude some classes of devices, such as USB hubs. For example, USB hubs may interfere with the operation of mediation unit 1144 and may be categorically restricted, such that when a USB hub is connected to computing device 1104, mediation unit 1144 does not virtualize the hub at guest operating system 1136 and may notify a user of the computing device that an unauthorized device is attached to computing device 1104.

Thus, the example of FIG. 6 illustrates a hypervisor-based mediation system that operates on computing device 1104. Mediation unit 1144 uses virtualization to obtain a privileged level of control over communications between USB device 1100 and an operating system of computing device 1104 that could not be achieved if mediation unit 1144 was simply a component within the operating system (e.g., a driver). In addition, mediation unit 1144 cannot be bypassed. For example, an end user can only interact with guest operating system 1136 and not hypervisor 1124. In this example, hypervisor 1124 may be locked down, e.g., encrypted, so that it could not be modified by the user.

Mediation unit 1144 is not constrained by hardware limitations, e.g., as a separate hardware unit. For example, because mediation unit 1144 is executed by processors 1112 of computing device 1104 in the example of FIG. 6, mediation unit 1144 has access to complex logic and high-level functions such as file system analysis. In addition, mediation unit 1144 does not require any additional hardware when used in a system having hardware-assisted virtualization (e.g., Intel's VT-x). That is, in the example of FIG. 6, mediation unit 1144 may be used in a system in which the underlying hardware may or may not have hardware-assisted virtualization.

In general, mediation unit 1144 only protects against attacks that subvert higher-level components such as guest operating system 1136 and drivers and software on that system. However, in some instances, mediation unit 1144 may be configured to detect anomalous behavior of lower-level components (e.g., such as BIOS or other low level processes) and take steps to mitigate the problem. Such techniques could also be carried out using a hybrid approach with mediation unit 1144 and additional hardware and/or software. For example, protocol enforcement components may be embedded in host controller logic 1116, while policy enforcement components may be included in mediation unit 1144, where high-level logic and reconfiguration is available.

It should be understood that the techniques for mediating communication described with respect to FIG. 6 may be performed by a variety of other systems having more or fewer components than those shown in FIG. 6. In addition, the techniques of FIG. 6 may be used in combination with any other techniques described in this disclosure. For example, the virtual machine mediation techniques may be supplemented by electronic protection units, such as electronic protection units 1044 (FIG. 1L).

Figure 7:
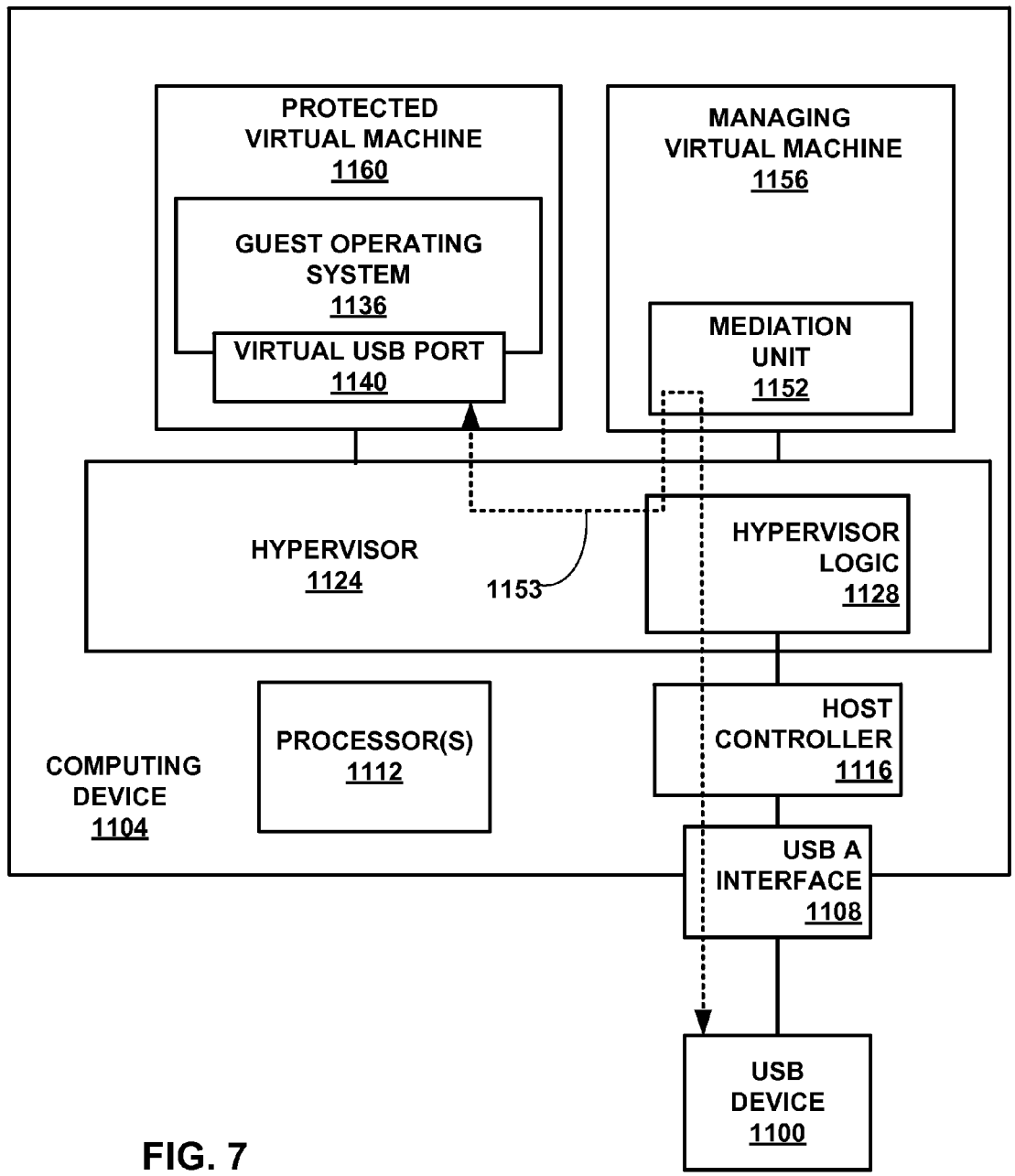
FIG. 7 is a block diagram illustrating another example system for mediating communication between a USB device and a host computing device, in accordance with techniques described in this disclosure.

FIG. 7 is a block diagram illustrating another example system for mediating communication between USB device 1100 and computing device 1104. According to some aspects of this disclosure, certain features and components of the system shown in FIG. 7 may be similar to those shown and described with respect to FIG. 6.

In the example of FIG. 7, however, the functions ascribed to mediation unit 1144 (FIG. 6) may be performed by a mediation unit 1152 of a managing virtual machine 1156, which may be in communication with protected virtual machine 1160. For example, hypervisor 1124 may manage and provide an operating platform for managing virtual machine 1156 and protected virtual machine 1160. Managing virtual machine 1156 may perform mediation functions via mediation unit 1152. That is, mediation unit 1152 may include software for performing the functions ascribed to mediation unit 1144 (FIG. 6). Mediation unit 1152 may be executed by a user-level application executing over a guest operating system executed by managing virtual machine 1156. Alternatively, the guest operating system executed by managing virtual machine 1156 may execute mediation unit 1152.

In an example, USB device 1100 may communicate with computing device 1104 via USB A interface 1108. Host controller 1116 receives a message from USB A interface and passes the message to hypervisor 1124. Managing virtual machine 1156 may be configured, using mediation unit 1152, to intercept messages received from USB devices, such as USB device 1100. Mediation unit 1152 may perform one or more mediation functions, as described above with respect to mediation unit 1144 (FIG. 6) and/or proxy/firewall units 1048 (FIGS. 1 and 3-5). Upon approval by mediation unit 1152, managing virtual machine 1156 may transmit the USB messages to virtual USB port 1140 of protected virtual machine 1160. In this way, managing virtual machine facilitates secure USB communications 1153 exchanged between virtual USB port 1140 and USB device 1100.

In some instances, hypervisor logic 1128 of hypervisor 1124 is configured to shunt USB communications 1153 received via USB A interface 1108 to managing virtual machine 1156 for mediation, as described above with respect to mediation unit 1152 and/or proxy/firewall units 1048. Managing virtual machine 1156 may transmit only approved USB communications among USB communications 1153 to virtual USB port while filtering disapproved USB communications among USB communications 1153. In some examples, managing virtual machine 1156 may transmit USB communications to virtual USB prot provided to protected virtual machine 1160 via hypervisor 1124. That is, hypervisor 1124 may be further configured to relay approved USB communications from managing virtual machine 1156 to virtual USB port 1140 of protected virtual machine 1160. In some examples, managing virtual machine 1156 and protected virtual machine 1160 exchange USB communications 1153 via a socket, shared memory, pipe, or other method for inter-process communication.

In some instances, managing virtual machine 1156 may have a higher privilege level in hypervisor 1124 than protected virtual machine 1160. For example, protected virtual machine may be prevented from virtualizing virtual USB port 1140 without gaining the appropriate permissions from managing virtual machine 1156. In this way, managing virtual machine 1156 may approve USB device 1100 and/or USB communications between virtual USB port 1140 and USB device 1100.

According to some aspects of this disclosure, guest operating system 1136 of protected virtual machine 1160 may be in communication with one or more other devices (e.g., non-USB devices) without interacting with managing virtual machine 1156. That is, managing virtual machine 1156 may be limited to managing USB communications, while other devices may communicate directly with guest operating system 1136 via protected virtual machine 1160. As such, hypervisor logic 1128 may be configured to distribute USB-only communications, while additional functionality of hypervisor 1124 distributes other device communications unmediated by managing virtual machine 1156.

The example of FIG. 7 illustrates meditation unit 1152 as being executed by managing virtual machine 1156. However, in some instances, one or more mediation functions may be additionally or alternatively performed by hypervisor 1124. That is, in some examples, mediation functions may be distributed between managing virtual machine 1156 and hypervisor 1124, such that both components are responsible for performing mediation functions. In one example for purposes of illustration, hypervisor 1124 may be responsible for determining whether packets conform to a particular USB standard, while managing virtual machine 1156 (via mediation unit 1152) may be responsible for identifying software based attacks (e.g., device emulation, malware propagation, and the like) and/or protocol based attacks. Thus, the mediation functions described herein may be performed by a hypervisor (such as hypervisor 1124 described with respect to FIG. 6), a virtual machine (such as managing virtual machine 1156), or any combination thereof.

FIG. 8 is a block diagram illustrating another example system for mediating communication between USB device 1100 and computing device 1104. According to some aspects of this disclosure, certain features and components of the system shown in FIG. 8 may be similar to those shown and described with respect to FIGS. 6 and 7. In the example of FIG. 8, however, hypervisor and mediation logic 1168 may be used control the flow of data between USB device 1100 and guest operating system 1136.

In some examples, hypervisor and mediation logic 1168 may be configured as a so-called "thin" or "lightweight" hypervisor using hypervisor features provided by any one or more of processors 1112. In general, a thin hypervisor such as hypervisor and mediation logic 1168 may transparently hook into many low level activities of computing device 1104 to monitor and/or emulate the activities. In the example of FIG. 8, all non-USB instructions are executed by guest operating system 1136 of computing device 1104 normally, e.g., without virtualization. However, hypervisor and mediation logic 1168 may provide a platform for a virtual machine and may control USB functionality at guest operating system 1136. That is, hypervisor and mediation logic 1168 may be responsible for virtualizing USB device 1100 at guest operating system 1136 and mediating communication between USB device 1100 and guest operating system 1136 (e.g., as described above with respect to mediation unit 1144 (FIG. 6) and/or proxy/firewall units 1048 (FIGS. 1 and 3-5)). In this example, guest operating system 1136 may be the primary operating system for computing device 1104, for hypervisory and mediation logic modifies the operation of guest operating system 1136 with respect to USB functionality.

Hypervisor and mediation logic 1168 may perform as little virtualization to achieve the mediation tasks as possible. That is, hypervisor and mediation logic 1168 may not otherwise modify components of computing device 1104, including other modules, libraries, drivers, etc., of guest operating system 1136, in order to mediate communication between USB device 1100, host controller 1116, and guest operating system 1136. However, USB instructions may not in some cases be easily and/or precisely parsed for hypervisor and mediation logic 1168 of host operating system 1136. Accordingly, in operation, hypervisor and mediation logic 1168 may virtualize (but not necessarily modify) a larger collection of instructions and/or operations associated with guest operating system 1136.

In some examples, hypervisor and mediation logic 1168 modifies an existing operating system of computing device 1104. Accordingly, hypervisor and mediation logic 1168 does not require installation of any particular hypervisor. Rather, a user may install a driver 1137 that injects a lightweight hypervisor (hypervisor and mediation logic 1168) into guest operating system 1136 to modify the operation of guest operating system 1136 with respect to USB communications to, among other operations, present virtual USB port 1140 to guest operating system 1136 for use by, e.g., one or more user applications (not shown in FIG. 8). For example, an operating system may typically begin in host mode of ring 0 (the level having the most physical privileges and allowing direct interaction with hardware components of computing device 1104). In some examples, by executing a kernel (e.g., the lightweight hypervisor represented by hypervisor and mediation logic 1168) with the highest privilege level, the operating system can be dislodged from the host mode and hypervisor and mediation logic 1168 can seize privilege and control of USB functionality. Thus, in some examples, operating system 1136 continues to occupy ring 0, while hypervisor and mediation logic 1168 operates in ring −1. According to some aspects of this disclosure, the driver noted above may be used to install or otherwise modify application code in the kernel. In some instances, the driver must be signed by a manufacturer of the operating system, such as Microsoft for the Windows® operating system.

Hypervisor and mediation logic 1168 may consist of only the hypervisor components necessary to create a virtual machine for virtualizing USB ports and mediating communication between USB A interface 1108 and the virtual ports. Hypervisor and mediation logic 1168 then mediates communications to implement USB protections, as described herein. Due to the limited scope of hypervisor and mediation logic 1168, hypervisor and mediation logic 1168 is configured to operate a virtual machine that virtualizes USB device 1100 but not configured to communicate with any other device, such that guest operating system 1136 communicates directly with the any other device (e.g., via conventional drivers of operating system 1136).

As noted above, hypervisor and mediation logic 1168 may operate with existing, already-installed operating systems, and does not require the installation of any particular hypervisor. Accordingly, hypervisor and mediation logic 1168 may be installed on systems with preexisting operating systems, such as guest operating system 1136, without the need to reinstall those operating systems. In addition, because the functionality of hypervisor and mediation logic 1168 is limited to USB communications, the impact to system performance may be relatively small.

Figure 9:
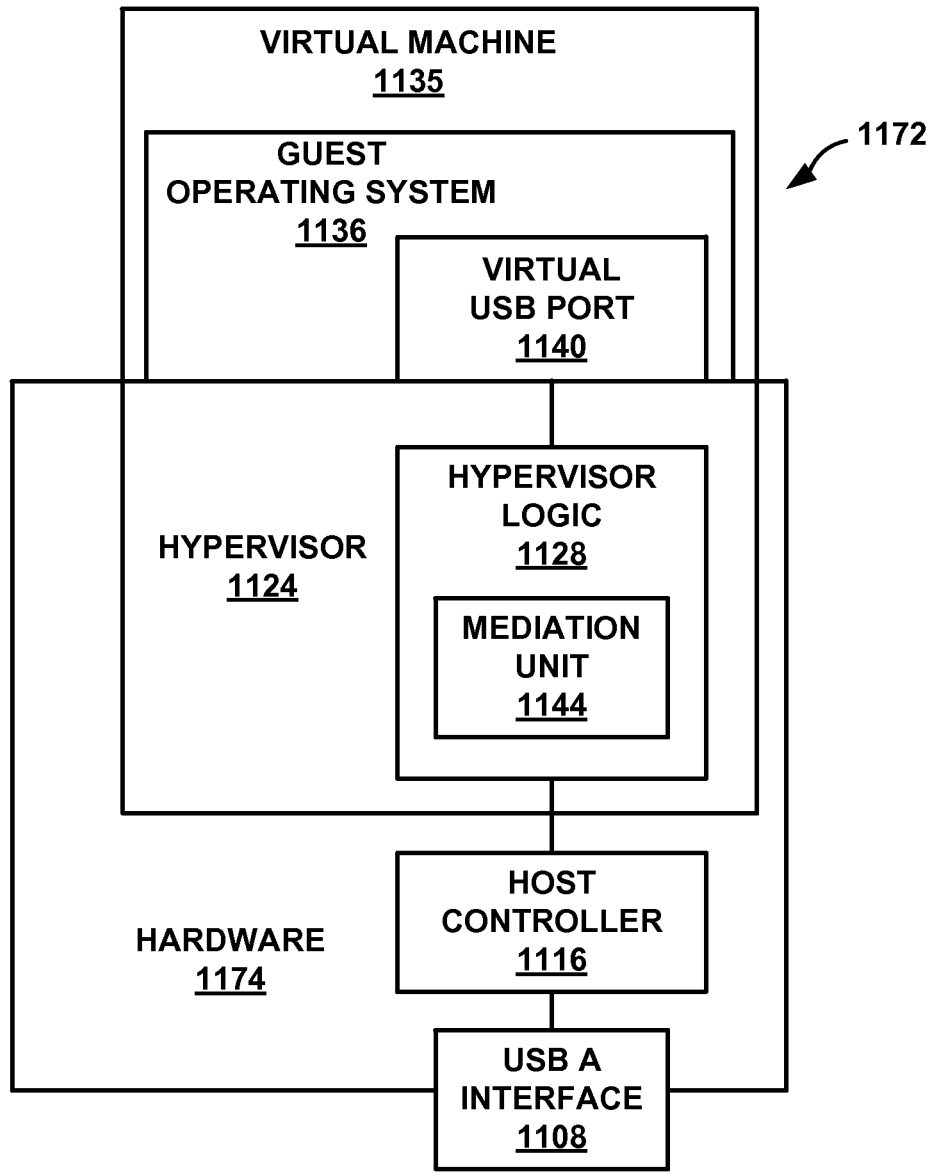
FIG. 9 is a block diagram illustrating another example system for mediating communication between a USB device and a host computing device, in accordance with techniques described in this disclosure.

FIG. 9 illustrates a particular application in which USB A interface 1108, host controller 1116, hypervisor 1124 and hypervisor logic 1128 including mediation unit 1144 are included in a mobile computing device 1172 having hardware 1174. Other components of hardware 1174, such as Flash or other non-volatile memory, static RAM or other volatile memory, user interface devices (e.g., a touch-sensitive screen, microphone, and/or speaker), and the like are not shown. As described above with respect to FIG. 6, hypervisor logic 1128 and mediation unit 1144 may be used control the flow of data between a USB device connected to USB A interface 1108 and guest operating system 1136.

For example, hypervisor 1124 may provide a platform for execution of virtual machine 1135 that operates on mobile computing device 172g. As noted above with respect to FIGS. 6-8, hypervisor 1124 and mediation unit 144 obtains a privileged level of control over communication between USB devices connected to USB A interface 1108 and guest operating system 1136 that could not be achieved if the techniques were simply incorporated in the operating system (e.g., a driver).

In some instances, the example shown in FIG. 9 may be similar to the example shown in FIG. 6, in that mediation unit 1144 integrates with an existing virtualization system (hypervisor) for a operating system of mobile computing device 1172. Mediation unit 1144 controls communications between the physical USB A interface 1108 and guest operating system 1136 to provide added security and apply device policies. In instances in which operating system 1136 of mobile computing device 1172 restricts a user's ability to interact with the operating system internals, the end user will only be able to interact with the guest operating system 1136 without bypassing the protection of mediation unit 1144.

Mediation unit 1144 is not constrained by hardware limitations, e.g., as a separate hardware unit. For example, because hypervisor logic 1128 and mediation unit 1144 is operating using hardware 1174 of mobile computing device 1172, mediation unit 1144 has access to complex logic and high-level functions such as file system analysis. Given a mobile computing debive that already has virtualization, the techniques of FIG. 9 may require no additional hardware. In some examples, mobile computing device 1172 may be configured with examples of protected virtual machine 1160 and managing virtual machine 1156 that execute functionality similar to that described above with respect to FIG. 7. In other words, mobile computing device 1172 may represent an example of computing device 1104 of FIG. 7.

Figure 10:
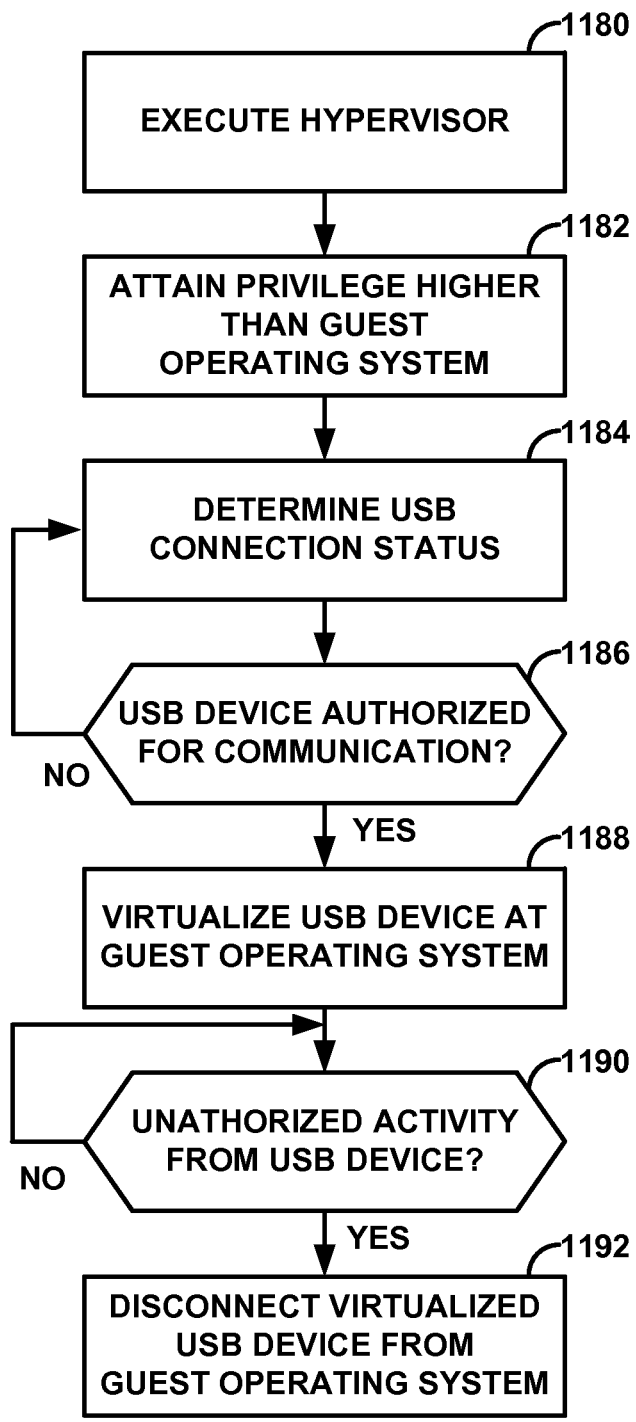
FIG. 10 is a flow diagram illustrating an example configuration operation of a system for mediating communication between a USB device and a host computing device, in accordance with one example of this disclosure.

FIG. 10 is a flow diagram illustrating an example process for mediating communication between a USB device and a host computing device. In the example of FIG. 10, a host computing device may execute a hypervisor capable of performing the USB mediation techniques described herein (1180). For example, the hypervisor may be configured to perform the USB mediation techniques described with respect to proxy/firewall units 1048, mediation unit 1144, hypervisor and mediation logic 1168, or any combination thereof using a virtual machine that interacts with a guest operating system of the host computing device. Additionally or alternatively, the hypervisor may create a virtual machine for performing one more USB mediation techniques, such as managing virtual machine 1156 including mediation unit 1152 (FIG. 7).

The hypervisor may attain a higher privilege level than an operating system of the host computing device (1182). For example, the hypervisor may attain a higher privilege level at boot up of the host computing device. In other examples, the hypervisor may attain a higher privilege level higher than the operating system at some point after boot up of the host computing device and operating system, e.g., via a hypervisor driver, as described above.

In any case, the hypervisor may determine a USB connection status (1184). That is, the hypervisor may determine whether any USB devices are connected to physical USB ports of the host computing device. Upon connection of a USB device, the hypervisor determines whether the connected USB device is authorized to communicate with the operating system of the host computing device (1186).

If the USB device is authorized to communicate with the operating system (the "yes" branch of step 1186), the hypervisor may virtualize the USB device at the operating system (1188). For example, the hypervisor may make the USB device available to the operating system, such that data may be transferred between the operating system and the USB device using the hypervisor as a proxy. If the USB device is not authorized to communicate with the operating system (the "no" branch of step 1186), the hypervisor may return to step 164 without virtualizing the USB device.

After virtualization (1188), the hypervisor may determine whether there is any unauthorized activity by the USB device (1190). For example, the hypervisor may be capable of detecting device emulation. The hypervisor may also monitor and analyze the contents of the packets communicated between the host computing device and the USB device to identify malformed packets or packets that contain known malware. In some instances, one or more functions of the hypervisor may be performed by a virtual machine associated with the hypervisor, as described above with respect to FIG. 7.

If the hypervisor detects any unauthorized activity by USB device (the "yes" branch of 1190), the hypervisor may disconnect the virtualized USB device from the operating system (1192). That is, the hypervisor may de-virtualize the USB device such that the operating system is not capable of communicating with the USB device.

It should be understood that the steps shown and described with respect to FIG. 10 are provided as merely one example. That is, the steps of the method of FIG. 10 need not necessarily be performed in the order shown in FIG. 10, and fewer, additional, or alternative steps may be performed.

This disclosure provides a variety of techniques for protecting a host computing device (and associated operating system) from communicating with unauthorized and/or rogue USB devices. The techniques may be performed in a variety of locations including an external device, a motherboard or peripheral component interconnect (PCI) card, integrated into host controller logic (or SoC logic for embedded systems), in a hypervisor and/or virtual machine, or in operating system logic.

In general, any combination of techniques may be performed separately or in combination, and may be conceptualized as a set of modular components. For example, one component includes connect/disconnect sensing and protection from hard electronic attacks, which may be incorporated in an external device or motherboard. Another component may also include USB protocol enforcement, which may be incorporated with any hardware implementation described above (some protections may also be possible using a hypervisor). Another component may also include snooping prevention (e.g., hiding packets from devices that are not intended to receive the packets), which may be incorporated with a motherboard or included in an external device. Still another component may include device policy enforcement, which may be implemented in hardware and/or software. Still another component may include higher-level logical operations (e.g., malware scanning), which may be implemented using hardware, with a hypervisor and/or using an operating system.

Thus, it should be understood that the names given to certain units, modules, or components described herein are provided for purposes of example only, and are not necessarily intended to encompass every functional aspect of the units, modules, or components. For example, while certain aspects of this disclosure refer to a "mediation" unit, it should be understood that the functional scope of the protection module is not strictly related to providing "protection" for a host computing device from one or more USB devices. That is, for example, it should be understood that the functional scope of the protection is not strictly related to providing security against rogue USB devices. In some examples, as described above, a mediation unit may also prevent certain USB devices from communicating with a host computing device due to an administrative decision by a system administrator, regardless of whether such USB devices pose a specific security risk.

The techniques described in this disclosure, including those attributed to mediation units, or various constituent components, may be implemented, at least in part, in hardware, software, firmware or any combination thereof. For example, various aspects of the techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as random access memory (RAM), read-only memory (ROM), non-volatile random access memory (NVRAM), electrically erasable programmable read-only memory (EEPROM), FLASH memory, magnetic data storage media, optical data storage media, or the like. The instructions may be executed to support one or more aspects of the functionality described in this disclosure.

Various examples have been described. These and other examples are within the scope of the following claims.

What is claimed is:

1. A computing device comprising:
    at least one processor;
    a hypervisor operable by the at least one processor as a primary operating system and configured to:
        determine whether a universal serial bus (USB) device is authorized to communicate with a guest operating system managed by the hypervisor;
        only after determining that the USB device is authorized to communicate with the guest operating system, virtualize the USB device to present a virtual USB device to the guest operating system and transmit messages between the USB device and the guest operating system through the virtual USB device; and
        virtualize one or more devices in addition to the USB device at the guest operating system.

2. The computing device of claim 1, wherein the hypervisor is configured with a higher privilege level than the guest operating system.

3. The computing device of claim 1, wherein the hypervisor is configured to manage a protected virtual machine that executes the guest operating system and a managing virtual machine, and wherein the managing virtual machine is configured to determine whether the USB device is authorized to communicate with the guest operating system executed by the protected virtual machine.

4. The computing device of claim 1, wherein the hypervisor is configured to refrain from virtualizing the USB device at the guest operating system upon determining that the USB device is not authorized to communicate with the guest operating system.

5. The computing device of claim 1, wherein hypervisor is configured to monitor one or more messages from the USB device for the guest operating system to detect a protocol violation by the USB device.

6. The computing device of claim 5, wherein the hypervisor is configured to prevent additional communications between the USB device and the guest operating system upon detecting a protocol violation.

7. The computing device of claim 1, wherein the hypervisor is further configured to virtualize a predetermined set of USB devices to present a predetermined set of virtual USB devices to the guest operating system.

8. The computing device of claim 1, further comprising a mediation unit that is configured to provide a message to the hypervisor that indicates whether the USB device is authorized to communicate with the guest operating system, such that that the hypervisor determines whether the USB device is authorized to communicate with the guest operating system based on the message.

9. A method comprising:
    determining whether a universal serial bus (USB) device is authorized to communicate with a guest operating system managed by a hypervisor operable as a primary operating system; and
    only after determining that the USB device is authorized to communicate with the guest operating system, virtualizing, by the hypervisor, the USB device to present a virtual USB device to the guest operating system and transmitting messages between the USB device and the guest operating system through the virtual USB device; and
    virtualizing, by the hypervisor, one or more devices in addition to the USB device at the guest operating system.

10. The method of claim 9, further comprising obtaining, by the hypervisor, a higher privilege level than the guest operating system.

11. The method of claim 9, further comprising:
    managing, by the hypervisor, a protected virtual machine that executes the guest operating system and a managing virtual machine and wherein the managing virtual machine is configured to determine whether the USB device is authorized to communicate with the guest operating system executed by the protected virtual machine.

12. The method of claim 9, further comprising refraining from virtualizing the USB device at the guest operating system upon determining that the USB device is not authorized to communicate with the guest operating system.

13. The method of claim 9, further comprising monitoring, by the hypervisor, one or more messages from the USB device for the guest operating system to detect a protocol violation by the USB device.

14. The method of claim 9, further comprising providing a message to the hypervisor that indicates whether the USB device is authorized to communicate with the guest operating system, such that that determining whether the USB device is authorized to communicate with the guest operating system is based on the message.

15. A system comprising:
one or more universal serial bus (USB) devices; and
a USB host device having at least one processor and a hypervisor, wherein the hypervisor is operable as a primary operating system by the at least one processor and configured to:
determine whether a universal serial bus (USB) device is authorized to communicate with a guest operating system managed by the hypervisor;
only after determining that the USB device is authorized to communicate with the guest operating system, virtualize the USB device to present a virtual USB device to the guest operating system and transmit messages between the USB device and the guest operating system through the virtual USB device; and
virtualize one or more devices in addition to the USB device at the guest operating system.

16. A computing device comprising:
at least one processor;
a hypervisor operable by the at least one processor and configured to:
determine whether a universal serial bus (USB) device is authorized to communicate with an operating system managed by the hypervisor;
only after determining that the USB device is authorized to communicate with the operating system, virtualize only the USB device and transmit messages between the USB device and the operating system, wherein the hypervisor is not configured to communicate with other devices, such that the other devices communicate directly with the operating system.

17. The computing device of claim 16, wherein the hypervisor is configured with a higher privilege level than the operating system.

18. The computing device of claim 16, wherein the hypervisor is configured to manage a protected virtual machine that executes the operating system and a managing virtual machine, and wherein the managing virtual machine is configured to determine whether the USB device is authorized to communicate with the operating system executed by the protected virtual machine.

19. The computing device of claim 16, wherein the operating system comprises a guest operating system executed by the hypervisor.

20. The computing device of claim 16, further comprising a driver operable by the at least one processor configured to modify the operating system to configure the operating system to execute the hypervisor.

21. The computing device of claim 16, wherein the hypervisor is configured to refrain from virtualizing the USB device at the operating system upon determining that the USB device is not authorized to communicate with the operating system.

22. The computing device of claim 16, wherein hypervisor is configured to monitor one or more messages from the USB device for the operating system to detect a protocol violation by the USB device.

23. The computing device of claim 22, wherein the hypervisor is configured to prevent additional communications between the USB device and the operating system upon detecting a protocol violation.

24. The computing device of claim 16, wherein the hypervisor is further configured to virtualize a predetermined set of USB devices to present a predetermined set of virtual USB devices to the operating system.

25. The computing device of claim 16, further comprising a mediation unit that is configured to provide a message to the hypervisor that indicates whether the USB device is authorized to communicate with the operating system, such that that the hypervisor determines whether the USB device is authorized to communicate with the operating system based on the message.

26. A method comprising:
determining whether a universal serial bus (USB) device is authorized to communicate with an operating system managed by a hypervisor; and
only after determining that the USB device is authorized to communicate with the operating system, virtualizing only the USB device and transmitting messages between the USB device and the operating system and without communicating with other devices, such that the other devices communicate directly with the operating system.

27. The method of claim 26, further comprising obtaining, by the hypervisor, a higher privilege level than the operating system.

28. The method of claim 26, further comprising:
managing, by the hypervisor, a protected virtual machine that executes the operating system and a managing virtual machine and wherein the managing virtual machine is configured to determine whether the USB device is authorized to communicate with the operating system executed by the protected virtual machine.

29. The method of claim 26, further comprising modifying the operating system to configure the operating system to execute the hypervisor.

30. The method of claim 26, further comprising refraining from virtualizing the USB device at the operating system upon determining that the USB device is not authorized to communicate with the operating system.

31. The method of claim 26, further comprising monitoring, by the hypervisor, one or more messages from the USB device for the operating system to detect a protocol violation by the USB device.

32. The method of claim 26, further comprising providing a message to the hypervisor that indicates whether the USB device is authorized to communicate with the operating system, such that that determining whether the USB device is authorized to communicate with the operating system is based on the message.

33. A system comprising:
one or more universal serial bus (USB) devices; and
a USB host device having at least one processor and a hypervisor, wherein the hypervisor is operable by the at least one processor and configured to:
determine whether a universal serial bus (USB) device is authorized to communicate with an operating system managed by the hypervisor;
only after determining that the USB device is authorized to communicate with the operating system, virtualize only the USB device and transmit messages between the USB device and the operating system, wherein the hypervisor is not configured to communicate with other devices, such that the other devices communicate directly with the operating system.

* * * * *